United States Patent
Wachi

(10) Patent No.: US 8,330,440 B2
(45) Date of Patent: Dec. 11, 2012

(54) POWER SUPPLY DEVICE WITH GAIN CHANGING ERROR AMPLIFIER

(75) Inventor: Takatsugu Wachi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 584 days.

(21) Appl. No.: 12/601,928

(22) PCT Filed: Oct. 16, 2008

(86) PCT No.: PCT/JP2008/068722
§ 371 (c)(1),
(2), (4) Date: Nov. 25, 2009

(87) PCT Pub. No.: WO2009/057453
PCT Pub. Date: May 7, 2009

(65) Prior Publication Data
US 2010/0176776 A1    Jul. 15, 2010

(30) Foreign Application Priority Data
Nov. 2, 2007 (JP) .................... 2007-286365

(51) Int. Cl.
G05F 1/575 (2006.01)
(52) U.S. Cl. ...................................... 323/282
(58) Field of Classification Search ............ 323/282
See application file for complete search history.

(56) References Cited

U.S. PATENT DOCUMENTS

| | | | | |
|---|---|---|---|---|
| 6,680,604 B2 * | 1/2004 | Muratov et al. | ............... | 323/285 |
| 7,495,423 B1 * | 2/2009 | Knight et al. | ................. | 323/284 |
| 7,535,211 B2 * | 5/2009 | Isham | ............................ | 323/284 |
| 7,919,952 B1 * | 4/2011 | Fahrenbruch | ................. | 323/222 |
| 8,018,207 B2 * | 9/2011 | Nishida | ......................... | 323/222 |
| 8,179,107 B2 * | 5/2012 | Fukushi | ......................... | 323/274 |
| 2004/0090217 A1 * | 5/2004 | Muratov et al. | ............... | 323/282 |
| 2004/0135566 A1 * | 7/2004 | Isham | ............................ | 323/285 |
| 2006/0044843 A1 | 3/2006 | Oswald et al. | | |
| 2006/0220743 A1 | 10/2006 | Kojima | | |
| 2007/0132439 A1 | 6/2007 | Tsuzaki | | |
| 2010/0176776 A1 * | 7/2010 | Wachi | ............................ | 323/282 |
| 2010/0308655 A1 * | 12/2010 | Wachi et al. | .................... | 307/31 |
| 2011/0101937 A1 * | 5/2011 | Dobkin et al. | ................. | 323/282 |
| 2011/0148381 A1 * | 6/2011 | Kwan et al. | .................... | 323/285 |

FOREIGN PATENT DOCUMENTS

| | | |
|---|---|---|
| CN | 1841924 | 10/2006 |
| CN | 1980027 | 6/2007 |
| JP | 2002-057534 | 2/2002 |
| JP | 2002-172938 | 6/2002 |
| JP | 2002-199406 | 7/2002 |
| JP | 2006-109689 | 4/2006 |
| JP | 2007-159340 | 6/2007 |

* cited by examiner

Primary Examiner — Jeffrey Sterrett
(74) Attorney, Agent, or Firm — Fish & Richardson P.C.

(57) ABSTRACT

A power supply device is provided with an output transistor for outputting a switch voltage having a rectangular waveform, based on an input signal by being switching-controlled by a pulse width modulation signal; a reference voltage generating circuit for generating a prescribed reference voltage; an error amplifier wherein a feedback voltage depending on the switch voltage and the reference voltage are inputted, an error voltage is generated by amplifying a difference between the voltages, and changes a gain of itself, in accordance with a current signal generated inside based on the feedback voltage and the reference voltage; an oscillator for generating an oscillation signal; and a comparator wherein the oscillation signal and the error voltages are inputted and the pulse width modulation signal is outputted by comparing the voltages.

7 Claims, 24 Drawing Sheets

FIG.3

| TERMINAL NO. | TERMINAL NAME | FUNCTION |
|---|---|---|
| 1 | DCSW1 | SWITCHING TERMINAL FOR 1.5V OUTPUT DC/DC CONVERTER |
| 2 | CSWON | CURRENT SWITCH CONTROL TERMINAL (ON STATE AT CSWON = HIGH) |
| 3 | PVCC1 | POWER-SUPPLY INPUT TERMINAL FOR 1.5V OUTPUT DC/DC CONVERTER |
| 4 | XLEDON | LED DRIVER CONTROL TERMINAL (ON STATE AT XLEDON = LOW) |
| 5 | PGND1 | GND TERMINAL FOR 1.5V OUTPUT DC/DC CONVERTER |
| 6 | PGND2 | GND TERMINAL FOR 3.3V OUTPUT DC/DC CONVERTER |
| 7 | RESERVE1 | OUR COMPANY'S RESERVE TERMINAL |
| 8 | PVCC2 | POWER-SUPPLY INPUT TERMINAL FOR 3.3V OUTPUT DC/DC CONVERTER |
| 9 | CS | CHIP SELECT TERMINAL (IC OPERATION AT CS = HIGH) |
| 10 | DCSW2 | SWITCHING TERMINAL FOR 3.3V OUTPUT DC/DC CONVERTER |
| 11 | VDCO2 | FEEDBACK TERMINAL FOR 3.3V OUTPUT DC/DC CONVERTER |
| 12 | RESERVE2 | OUR COMPANY'S RESERVE TERMINAL |
| 13 | XRESET | RESET OUTPUT TERMINAL |
| 14 | AGND | ANALOG GND TERMINAL |
| 15 | VDCO1 | FEEDBACK TERMINAL FOR 1.5V OUTPUT DC/DC CONVERTER |
| 16 | XHRST | EXTERNAL RESET TERMINAL (RESET STATE AT XHRST = LOW) |
| 17 | LEDO | LED DRIVER OUTPUT TERMINAL |
| 18 | AVCC | ANALOG PUWER-SUPPLY TERMINAL |
| 19 | CSWI | CURRENT SWITCH INPUT TERMINAL |
| 20 | CSWO | CURRENT SWITCH OUTPUT TERMINAL |

FIG.4

| TERMINAL NO. | TERMINAL NAME | EQUIVALENT CIRCUIT | FUNCTION |
|---|---|---|---|
| 2<br>4<br>9 | CSWON<br>XLEDON<br>CS | (circuit with AVCC, AGND, ※1) | TTL LEVEL INPUT TERMINAL<br><br>※1 (2)CSWON,(4)XLEDON<br>PULL-DOWN RESISTOR |
| 16 | XHRST | (circuit with AVCC, AGND) | TTL LEVEL<br>HYSTERESIS INPUT TERMINAL |
| 1<br>10 | DCSW1<br>DCSW2 | (circuit with PVCC, PGND, ※1) | POWER MOS DRIVER<br>FOR SYNCHRONOUS RECTIFICATION<br><br>※1 ELECTROSTATIC PROTECTION<br>CLAMPER |
| 13 | XRESET | (circuit with AVCC, AGND) | OPEN COLLECTOR OUTOUT |
| 3<br>8 | PVCC1<br>PVCC2 | (circuit with AVCC, AGND, PGND, ※1) | EACH POWER-SUPPLY<br>INPUT TERMINAL PROTECTION DIODE<br><br>※1 ELECTROSTATIC PROTECTION<br>CLAMPER |

FIG.6

| ITEM | SYMBOL | CONDITION | VALUE | UNIT |
|---|---|---|---|---|
| [OPERATING POWER-SUPPLY VOLTAGE] | | | | |
| PVCC1 TERMINAL VOLTAGE | PVCC1 | PVCC1=PVCC2=AVCC | 4.5~5.5 | V |
| PVCC2 TERMINAL VOLTAGE | PVCC2 | PVCC1=PVCC2=AVCC | 4.5~5.5 | V |
| AVCC TERMINAL VOLTAGE | AVCC | PVCC1=PVCC2=AVCC | 4.5~5.5 | V |
| [SYSTEM POWER-SUPPLY LSI] | | | | |
| CONSUMED CURRENT | ICC | VDCO1=VDCO2=5V CSWON=5V,XLEDON=0V XHRST=5V,CS=5V | 1.25~2.50 | mA |
| SHUTDOWN CURRENT | ISHUT | CS=0V | 0.42-0.80 | mA |
| CS"H"LEVEL INPUT VOLTAGE | VCSH | | 2.0 | V |
| CS"L"LEVEL INPUT VOLTAGE | VCSL | | 0.8 | V |
| CS INPUT CURRENT 1 | ICS1 | CS=0V | -5.0~5.0 | μA |
| CS INPUT CURRENT 2 | ICS2 | CS=5V | -5.0~5.0 | μA |
| [DC/DC CONVERTER PORTION] | | | | |
| VDCO1 VOLTAGE | VDCO1 | | 1.455~1.545 | V |
| VDCO2 VOLTAGE | VDCO2 | | 3.201~3.399 | V |
| OSCILLATING FREQUENCY | FOSC | | 2.1~3.9 | MHz |
| DCSW1 HIGH-SIDE SWITCH-ON RESISTOR | RONH1 | | 0.40~0.60 | Ω |
| DCSW1 LOW-SIDE SWITCH-ON RESISTOR | RONL1 | | 0.30~0.50 | Ω |
| DCSW2 HIGH-SIDE SWITCH-ON RESISTOR | RONH2 | | 0.40~0.60 | Ω |
| DCSW2 LOW-SIDE SWITCH-ON RESISTOR | RONL2 | | 0.30~0.50 | Ω |
| SOFT-START TIME | TSOFT | NO LOAD | 0.6~1.8 | ms |
| [RESET PORTION] | | | | |
| RESET ON VOLTAGE | VRSTON1 | AVCC VOLTAGE MONITORING | 3.60~3.80 | V |
| | VRSTON2 | VDCO2 VOLTAGE MONITORING | 2.59~2.81 | V |
| RESET HYSTERESIS WIDTH | VRSTHYS1 | AVCC VOLTAGE MONITORING | 140~260 | mV |
| | VRSTHYS2 | VDCO2 VOLTAGE MONITORING | 70~130 | mV |
| RESET OUTPUT SINK VOLTAGE | VRSINK | Isink=1.0mA | 0.3 | V |
| RESET OUTPUT LEAK CURRENT | IRLK | | -5.0~5.0 | μA |
| RESET DELAY TIME | TRST | | 30~70 | ms |
| XHRST THRESHOLD VOLTAGE | VXHRST | DECISION AT XRESET=0V | 0.8~1.6 | V |
| XHRST HYSTERESIS WIDTH | VXHRHYS | | 70~330 | mV |
| XHRST INPUT CURRENT | IXHRST | | -5.0~5.0 | μA |
| [LED DRIVER PORTION] | | | | |
| LED DRIVER ON RESISTOR | RLEDO | XLEDON=0V | 5~10 | Ω |
| XLEDON"H"LEVEL INPUT VOLTAGE | VLEDH | | 2.0 | V |
| XLEDON"L"LEVEL INPUT VOLTAGE | VLEDL | | 0.8 | V |
| XLEDON INPUT CURRENT 1 | ILED1 | XLEDON=0V | -5.0~5.0 | μA |
| XLEDON INPUT CURRENT 2 | ILED2 | XLEDON=5V | 33~100 | μA |
| [CURRENT SWITCH PORTION] | | | | |
| CURRENT SWITCH DRIVER ON RESISTOR | RCSW | CSWON=5V | 0.5~1.0 | Ω |
| CSWON"H"LEVEL INPUT VOLTAGE | VCSWH | | 2.0 | V |
| CSWON"L"LEVEL INPUT VOLTAGE | VCSWL | | 0.8 | V |
| CSWON INPUT CURRENT 1 | ICSW1 | CSWON=0V | -5.0~5.0 | μA |
| CSWON INPUT CURRENT 2 | ICSW2 | CSWON=5V | 33~100 | μA |

POWER SUPPLY DEVICE WITH GAIN CHANGING ERROR AMPLIFIER

TECHNICAL FIELD

The present invention relates to a power supply device that generates a desired output voltage from an input voltage.

BACKGROUND ART

Conventionally, as mean that generates a desired output voltage from an input voltage, switching power supply devices by which high accuracy and high efficiency are obtained are widely generally used.

As examples of conventional technologies related to the above, there are patent documents 1, 2 by the applicant of the present invention.

Patent document 1: JP-A-2002-172938
Patent document 2: JP-A-2002-199406

DISCLOSURE OF THE INVENTION

Problems to be Solved by the Invention

The above switching power supply device uses an LC filter to smooth a pulse voltage obtained by switching operation and generates a desired output voltage. Accordingly, to prevent the output voltage from oscillating, it is necessary to perform suitable phase compensation in feedback control of the output voltage; in the conventional switching power supply device, as an inductor and an output capacitor that form the LC filter, or as a resistor and a capacitor that are connected to an error amplifier, high-cost and large elements must be used, which brings increase in cost and device scale.

In light of the above problems, it is an object of the present invention to provide a power supply device that is capable of performing suitable phase compensation in feedback control of an output voltage.

Means for Solving the Problem

To achieve the above object, a power supply device according to the present invention is so structured (first structure) as to include: an output transistor that, by being switching-controlled by a pulse-width modulation signal, outputs a rectangular-wave switch voltage based on an input signal; a reference voltage generation circuit that generates a predetermined reference voltage; an error amplifier into which a feedback voltage depending on the switching voltage and the reference voltage are input and which amplifies a difference between both to generate an error voltage and changes its gain based on an electric-current signal that is generated therein based on the feedback voltage and the reference voltage; an oscillator that generates an oscillation signal; and a comparator into which the oscillation signal and the error voltage are input and which compares them to output the pulse-width modulation signal.

In the power supply device having the above first structure, it is desirable to be so structured (second structure) that the error amplifier includes: an input stage into which the reference voltage and the feedback voltage are input and which outputs a voltage signal; and an output stage into which a voltage signal from the input stage is input and which converts the voltage signal into an electric-current signal; wherein a boost circuit whose impedance changes based on a frequency of the electric-current signal is inserted in the output stage.

Besides, in the power supply device having the second structure, the output stage is so structured to include a current mirror, wherein it is good to be so structured (third structure) that a voltage signal at the input stage is input into an input-side transistor of the current mirror; and the boost circuit is inserted between an output-side transistor of the current mirror and a ground terminal.

Besides, in the power supply device having the third structure, it is good to be so structured (fourth structure) that the boost circuit is composed of a resistor and a capacitor that are connected in parallel with each other.

In addition, a power supply device according to the present invention is so structured (fifth structure) as to include: an output transistor that outputs a rectangular-wave switch voltage based on an input signal by undergoing switching control by a pulse-width modulation signal; a first terminal that outputs the switch voltage; a reference voltage generation circuit that generates a predetermined reference voltage; a second terminal into which a feedback voltage that depends on the switch voltage is input; an error amplifier into which the feedback voltage input from the second terminal and the reference voltage are input and which amplifies a difference between both to generate an error voltage, and changes its gain according to an electric-current signal that is generated therein based on the feedback voltage and the reference voltage; an oscillator that generates an oscillation signal; and a comparator into which the oscillation signal and the error signal are input and which compares them to output the pulse-width modulation signal.

Here, it is good to be so structured (sixth structure) that the power supply device having the fifth structure further includes an inductor whose one end is connected to the first terminal; and a capacitor that is connected to the other end of the inductor, wherein an output voltage is output from the other end of the inductor to a load.

Besides, it is good to so structure (seventh structure) the power supply device having the sixth structure that an inductance value of the inductor is 1.5 [μH] and a capacity value of the capacitor is 10 [μF].

Advantages of the Invention

A power supply device according to the present invention is able to perform a suitable phase compensation in feedback control of an output voltage despite a low-cost structure.

BRIEF DESCRIPTION OF DRAWINGS

[FIG. 3] is a table showing pin numbers, terminal names and functions of external terminals.

[FIG. 4] is a table showing pin numbers, terminal names, equivalent circuits and functions of external terminals.

[FIG. 6] is a table showing electric characteristics of the semiconductor apparatus 10.

LIST OF REFERENCE SYMBOLS 10 semiconductor apparatus (system power supply LSI)
A DC/DC converter portion
A11, A12 error amplifiers
A11a input stage
A11b output stage
A21, A22 PWM comparators
A31, A32 control drivers
A41, A42 current limit circuits
A51, A52 P channel type MOS field effect transistors
A61, A62 N channel type MOS field effect transistors
A7 reference voltage generation circuit
A8 oscillator
A9 soft-start circuit
B reset portion
B1 reset control circuit
B2 logical adder
B3 npn type bipolar transistor
C LED driver portion
C1 controller
C2 P channel type MOS field effect transistor
C3 current limit circuit
C3a, C3b comparators
C3c sense resistor
C3d DC voltage source
D current switch portion
D1 controller
D2 P channel type MOS field effect transistor
D3 current limit circuit
L1, L2 inductors
CO1, CO2 output capacitors
CB1, CB2 bypass capacitors
Q1, Q2 npn type bipolar transistors
R1 resistor
I1 constant-current source
BST boost circuit
RBST resistor
CBST capacitor
Qa, Qb, Qc npn type bipolar transistors
Qd, Qe npn type bipolar transistors
Ra, Rb, Rc, Re resistors

BEST MODE FOR CARRYING OUT THE INVENTION

Figure 1:
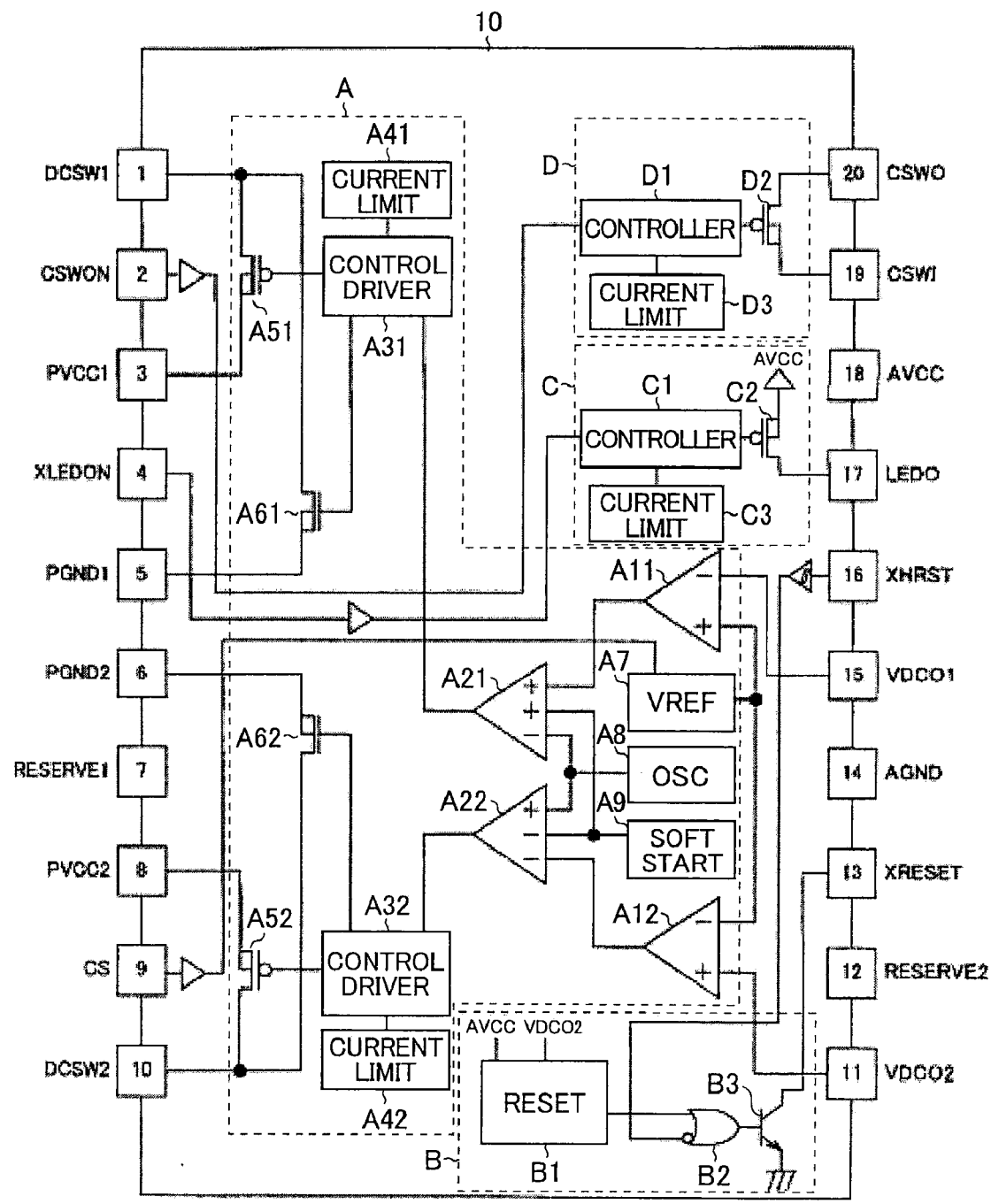
[FIG. 1] is a block diagram showing an embodiment of a semiconductor apparatus according to the present invention.

FIG. 1 is a block diagram showing an embodiment of a semiconductor apparatus according to the present invention.

First, an overview of a semiconductor apparatus 10 in the present embodiment is described.

Figure 2:
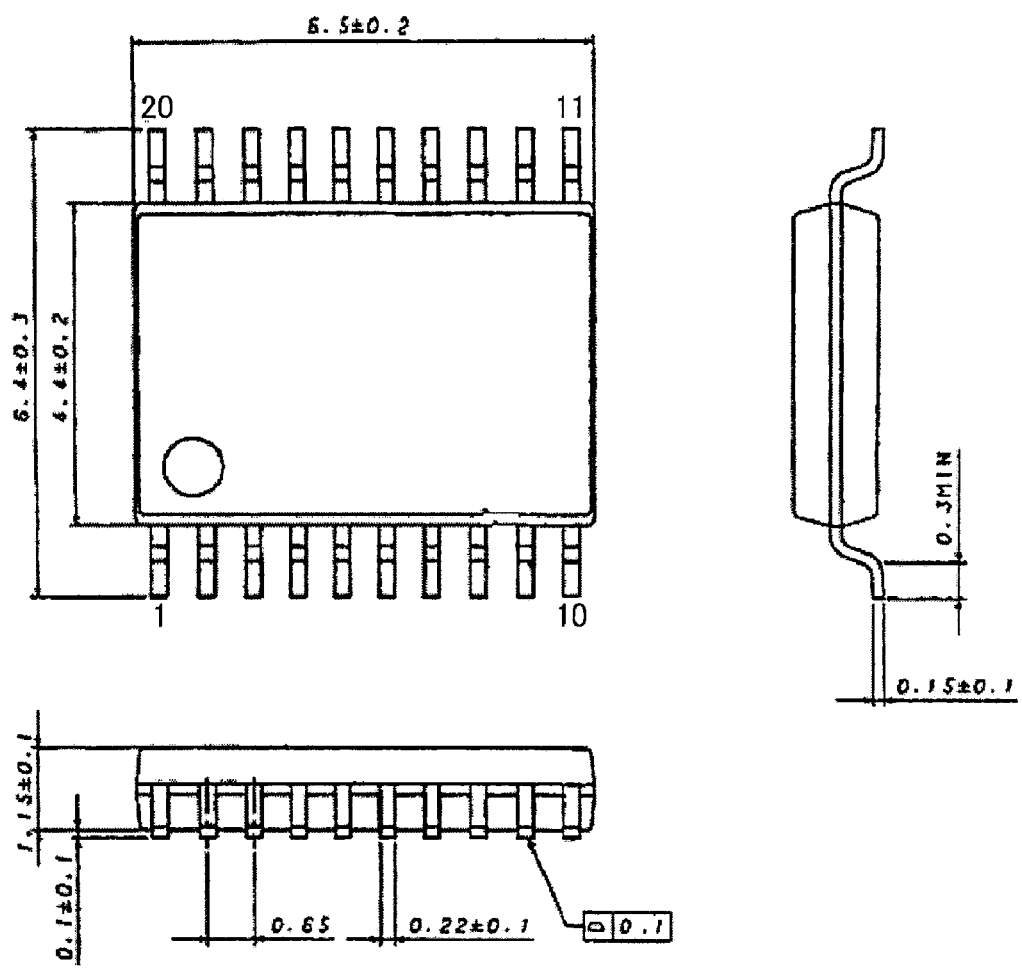
[FIG. 2] is an external-size diagram of a semiconductor apparatus 10.

The semiconductor apparatus 10 shown in FIG. 1 is a system power supply LSI for optical disc drives such as a DVD (Digital Versatile Disc), a CD (Compact Disc) and the like. The first feature is that a synchronous rectification type step-down DC/DC converter having a 3.3 [V] output is incorporated. The second feature is that a synchronous rectification type step-down DC/DC converter having a 1.5 [V] output is incorporated. The third feature is that a ripple interference is curbed by forcing each-channel DC/DC converter to perform inverse-phase switching operation. The fourth feature is that a soft-start function (1 [ms] (Typ.)) is incorporated. The fifth feature is that an output current limiter and a short-circuit protection function are incorporated. The sixth feature is that a phase compensation function of an error amplifier is incorporated. The seventh feature is that the operation frequency is set to 3.0 [MHz] (Typ.). The eighth feature is that a reset circuit is incorporated. The ninth feature is that an analog power-supply voltage AVCC and a DC/DC converter output are monitored in reset detection. The tenth feature is that a timer circuit for counting a reset delay time (50 [ms] (Typ.)) is incorporated. The eleventh feature is that a P channel type MOS (Metal Oxide Semiconductor) field effect transistor for an LED (Light emitting Diode) driver is incorporated. The twelfth feature is that a current switch which uses a P channel type MOS field effect transistor is incorporated. The thirteenth feature is that a shutdown function is incorporated. The fourteenth feature is that a package shown in FIG. 2 is employed. Here, the unit of dimensional values described in FIG. 2 is millimeter.

The semiconductor apparatus 10 in the present embodiment having the above features, as shown in FIG. 1, integrates: a DC/DC converter portion A; a reset portion B; an LED driver portion C and a current switch portion D.

The DC/DC converter portion A includes: error amplifiers A11, A12; PWM [Pulse Width Modulation] comparators A21, A22; control drivers A31, A32; current limit circuits A41, A42; P channel type MOS field effect transistors A51, A52; N channel type MOS field effect transistors A61, A61; a reference voltage generation circuit A7; an oscillator A8; and a soft-start circuit A9. The DC/DC converter portion A uses a first DC/DC converter for generating an output voltage of 1.5 [V] and a second DC/DC converter for generating an output voltage of 3.3 [V] to generate two-channel output voltages.

The reset portion B includes: a reset control circuit B1; a logical adder B2; and an npn type bipolar transistor B3.

The LED driver portion C includes: a controller C1; a P channel type MOS field effect transistor C2; and a current limit circuit C3.

The current switch portion D includes: a controller D1; a P channel type MOS field effect transistor D2; and a current limit circuit D3.

Besides, the semiconductor apparatus 10 in the present embodiment includes 20 external terminals (1 pin to 20 pin) as means to secure electric connection with the outside.

FIG. 3 is a table showing pin numbers, terminal names and functions of external terminals. Besides, FIG. 4 is a table showing pin numbers, terminal names, equivalent circuits and functions of external terminals.

A DCSW1 (1 pin) is a switching terminal of a DC/DC converter that generates an output voltage of 1.5 [V]. An electrostatic protection clamper is connected between the DCSW1 and a PGND1 terminal (5 pin).

A CSWON terminal (2 pin) is a current switch control terminal; when the CSWON terminal is at a high level, the current switch portion C goes into an on state. The CSWON terminal is used as a TTL (Transistor-Transistor-Logic) level input terminal; in its signal route, an electrostatic protection resistor (4 [kΩ] (Typ.)) is connected. Besides, between the CSWON terminal and an AVCC terminal (18 pin), and between the CSWON terminal and an AGND terminal (14 pin), electrostatic protection diodes are separately connected. In addition, between the CSWON terminal and the AGND terminal, a pull-down resistor (100 [kΩ] (Typ.)) is connected.

A PVCC1 terminal (3 pin) is a power-supply input terminal for the DC/DC converter that generates an output voltage of 1.5 [V]. Here, between the PVCC1 terminal and the AVCC terminal, an electrostatic protection diode is connected. Besides, between the PVCC1 terminal and a PGND1 terminal, and between the AVCC terminal and the PGND1 terminal, electrostatic protection clampers are separately connected.

An XLEDON terminal (4 pin) is an LED driver control terminal; when the XLEDON terminal is at a low level, the LED driver portion C goes into an on state. The XLEDON terminal is used as a TTL level input terminal; in its signal route, an electrostatic protection resistor (4 [kΩ] (Typ.)) is connected. Besides, between the XLEDON terminal and the AVCC terminal, and between the XLEDON terminal and the AGND terminal, electrostatic protection diodes are separately connected. In addition, between the XLEDON terminal and the AGND terminal, a pull-down resistor (100 [kΩ] (Typ.)) is connected.

The PGND1 terminal (5 pin) is a GND terminal for the DC/DC converter that generates an output voltage of 1.5 [V].

A PGND2 terminal (6 pin) is a GND terminal for the DC/DC converter that generates an output voltage of 3.3 [V].

A RESERVE1 terminal (7 pin) is a reserve terminal that is not used in a usual time, and it is desirable to ground it in the usual time.

A PVCC2 terminal (8 pin) is a power-supply input terminal for the DC/DC converter that generates an output voltage of 3.3 [V]. Here, between the PVCC2 terminal and the AVCC terminal, an electrostatic protection diode is connected. Besides, between the PVCC2 terminal and the PGND2 terminal, and between the AVCC terminal and the PGND2 terminal, electrostatic protection clampers are separately connected.

A CS terminal (9 pin) is a chip select terminal; when the CS terminal is at a high level, the semiconductor 10 goes into an operation state. The CS terminal is used as a TTL level input terminal; in its signal route, an electrostatic protection resistor (4 [kΩ] (Typ.)) is connected. Besides, between the CS terminal and the AVCC terminal, and between the CS terminal and the AGND terminal, electrostatic protection diodes are separately connected.

A DCSW2 terminal (10 pin) is a switching terminal for the DC/DC converter that generates an output voltage of 3.3 [V].

Here, between the DCSW2 terminal and the PGND2 terminal, an electrostatic protection clamper is connected.

A VDCO2 terminal (11 pin) is a feedback terminal for the DC/DC converter that generates an output voltage of 3.3 [V].

A RESERVE2 terminal (12 pin) is a reserve terminal that is not used in a usual time, and it is desirable to ground it in the usual time.

An XRESET terminal (13 pin) is a reset output terminal. The XRESET terminal is an open collector output type. Besides, between the XRESET terminal and the AVCC terminal, and between the XRESET terminal and the AGND terminal, electrostatic protection diodes are separately connected.

The AGND terminal (14 pin) is an analog GND terminal.

A VDCO1 terminal (15 pin) is a feedback terminal for the DC/DC converter that generates an output voltage of 1.5 [V].

An XHRST terminal (16 pin) is an external reset terminal; when the XHRST terminal is at a low level, the reset portion B goes into a reset state. The XHRST terminal is used as a TTL level hysteresis input terminal; in its signal route, an electrostatic protection resistor (4 [kΩ] (Typ.)) is connected. Besides, between the XHRST terminal and the AVCC terminal, and between the XHRST terminal and the AGND terminal, electrostatic protection diodes are separately connected.

An LEDO terminal (17 pin) is an LED driver output terminal.

The AVCC terminal (18 pin) is an analog power-supply terminal.

A CSWI terminal (19 pin) is a current switch input terminal.

A CSWO terminal (20 pin) is a current switch output terminal.

Figure 5:
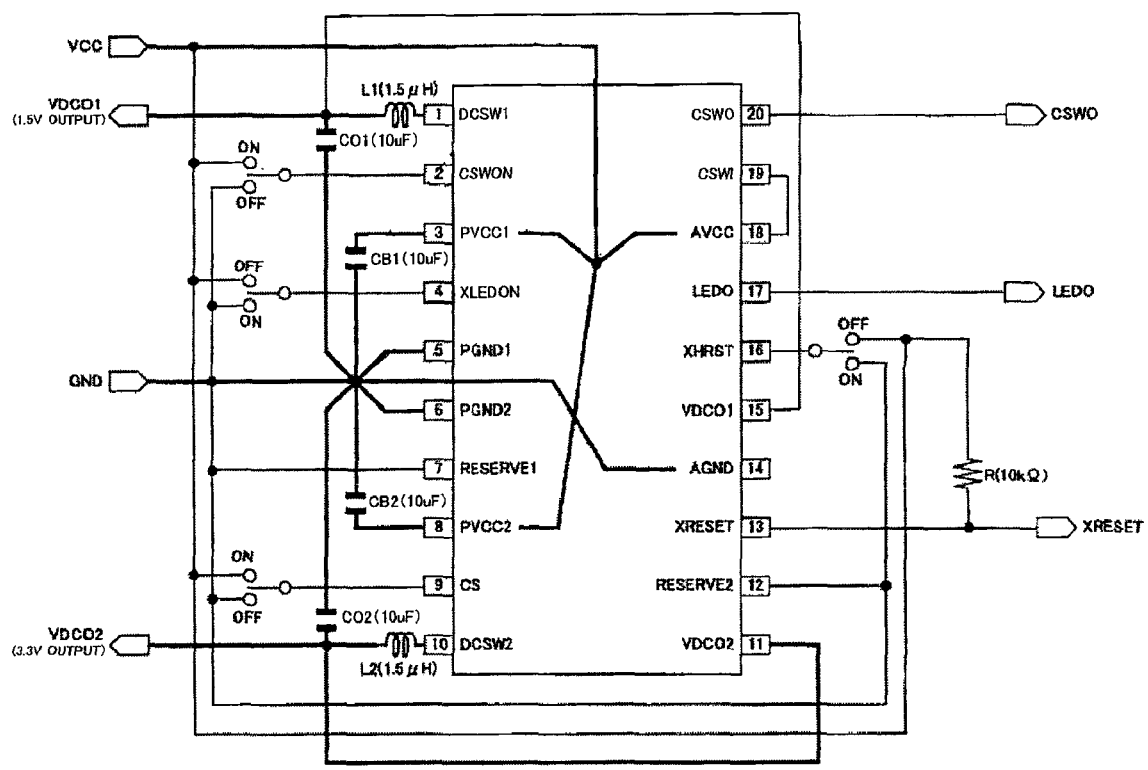
[FIG. 5] is an applied circuit diagram for describing terminal connections of external terminals.

Next, a detailed description over terminal connections of external terminals is performed with reference to an applied circuit diagram shown in FIG. 5.

FIG. 5 is an applied circuit diagram for describing terminal connections of external terminals.

As for a board pattern, it is desirable that the PVCC1 terminal, the PVCC2 terminal and the AVCC terminal are connected to the power supply on the board. Besides, it is desirable that the PGND1 terminal, the PGND2 terminal and the AGND terminal are connected to a GND on the board at one point. In addition, it is desirable that a large short wiring is used for the PVCC1 terminal, the PVCC2 terminal and the AVCC terminal to sufficiently drop the impedance. Further, it is desirable that a large short wiring is also used for the PGND1 terminal, the PGND2 terminal and the AGND terminal to sufficiently drop the impedance. As for output voltages (VDCO1, VDCO2) from the DC/DC converter, as shown in the diagram, it is desirable to pull out the voltages from both ends of output capacitors CO1, CO2. Moreover, because performance of the DC/DC converter is influenced by the board pattern and peripheral parts, it is desirable to sufficiently study design of the periphery circuit.

As for external elements, it is desirable that ceramic capacitors which have low equivalent series resistance are used as bypass capacitors CB1, CB2 which are connected between the PVCC terminal and the PGND1 terminal, and between the PVCC terminal and the PGND2 terminal and are disposed as near the semiconductor apparatus 10 as possible. Besides this, it is desirable that external elements such as inductors, capacitors and the like are disposed as near the semiconductor apparatus 10 as possible, and a large short wiring is used for a place where especially a large current flows.

FIG. 6 is a table showing electric characteristics of the semiconductor apparatus 10 having the above structure. Here, unless otherwise specified, the electric characteristics shown in FIG. 6 are numerical values at PVCC1=PVCC2=AVCC=5.0 [V], ambient temperature Ta=25 [° C.].

Next, various functions of the semiconductor 10 having the above structure are described.

First, a function of the DC/DC converter portion A is described.

The DC/DC converter portion A includes: a first synchronous rectification type DC/DC converter for generating a first output voltage VDCO1; and a second synchronous rectification type DC/DC converter for generating a second output voltage VDCO2.

Needed as external elements are: step-down inductors L1, L2 (1.5 [μH] recommended); output capacitors CO1, CO2 (10 [μF] recommended); and bypass capacitors CB1, CB2 (10 [μF] recommended) that are separately connected between the PVCC1 terminal and the PGND1 terminal, and between the PVCC2 terminal and the PGND2 terminal (see FIG. 5).

The DC/DC converter portion A starts operation at a UVLO (Under Voltage Lock Out) release voltage (3.75 [V] (Typ.)).

The error amplifier A11 amplifies a difference between a reference voltage VREF applied to a non-inverting input terminal (+) and an output voltage VDCO1 applied to an inverting input terminal (−) to generate an error voltage Verr1. A PWM comparator A21 compares the lower one of the error voltage Verr1 applied to a first non-inverting input terminal (+) and a soft-start voltage Vss applied to a second non-inverting input terminal (+) with a saw-tooth voltage Vsaw applied to an inverting input terminal (−); and generates a comparison signal Vcmp1 that has a duty ratio according to the comparison result. The control driver A31 performs on/off control of transistors 51, 61 based on the comparison signal Vcmp1 to generate a pulse voltage at the DCSW1 terminal. This is smoothed by an external LC filter (L1, CO1 in FIG. 5), so that the first output voltage VDCO1 (1.5 [V] (Typ.)) is generated.

The error amplifier A12 amplifies a difference between the reference voltage VREF applied to an inverting input terminal (−) and an output voltage VDCO2 applied to a non-inverting input terminal (−) to generate an error voltage Verr2. A PWM comparator A22 compares the lower one of the error voltage Verr2 applied to a first inverting input terminal (−) and the soft-start voltage Vss applied to a second inverting input terminal (−) with the saw-tooth voltage Vsaw applied to a non-inverting input terminal (+); and generates a comparison signal Vcmp2 that has a duty ratio according to the comparison result. The control driver A32 performs on/off control of transistors 52, 62 based on the comparison signal Vcmp2 to generate a pulse voltage at the DCSW2 terminal. This is smoothed by an external LC filter (L2, CO2 in FIG. 5), so that the second output voltage VDCO2 (3.3 [V] (Typ.)) is generated.

The DC/DC converter portion A is so structured as to perform on/off control of the first and second DC/DC converters at inverse phases with each other. According to such structure, it becomes possible to curb a ripple interference between the first and second DC/DC converters.

Besides, as for the maximum output current from the DC/DC converter portion A, so that it does not exceed an acceptable loss, about 500 [mA] is assumed.

In addition, at a startup time of the DC/DC converter portion A, to gradually raise the first output voltage VDCO1 and the second output voltage DVCO2, switching control of the transistors 51, 61 and the transistors 52, 62 is performed by operation of the soft-start circuit A9 (1.0 [ms] (Typ.)).

Specifically, because the output voltages VDCO1, VDCO2 are zero immediately after the startup of the DC/DC converter portion A, the error voltages Verr1, Verr2 become extremely large. Accordingly, if the error voltages Verr1, Verr2 are compared with the saw-tooth voltage Vsaw, the duty ratios of the comparison signals Vcmp1, Vcmp2 become excessively large, so that an overcurrent flows in a load.

To prevent this, the semiconductor apparatus 10 in the present embodiment is so structured that besides the error voltages Verr1, Verr2, the soft-start voltage Vss is input into the PWM comparators A21, A22; if the soft-start voltage Vss is lower than the error voltages Verr1, Verr2, the duty ratios of the comparison signals Vcmp1, Vcmp2 are decided not according to the error voltages Verr1, Verr2 but according to a result of a comparison between the soft-start voltage Vss and the saw-toot voltage Vsaw.

In the semiconductor apparatus 10 in the present embodiment, the soft-start circuit A9 is so structured as to flow a predetermined current into the capacitor, thereby generating the soft-start voltage Vss which starts to rise slowly after the startup of the apparatus.

As described above, according to the structure having the soft-start circuit A9, it becomes possible to prevent an overcurrent from flowing into a load in the startup time of the apparatus.

Next, a function of the reset portion B is described.

The reset portion B is a means that transmits a reset signal to a DSP (Digital Signal Processor) and the like that are incorporated in a set. The XRESET terminal that corresponds to an output terminal of the reset signal is an open collector output of the transistor B3 and needs a pull-up resistor R (10 [kΩ]) as an external element (see FIG. 5).

If the reset control circuit B1 detects that the analog power-supply voltage AVCC is equal to or lower than 3.7 [V] (Typ.) or the second output voltage VDCO2 is equal to or lower than 2.7 [V] (Typ.), the reset control circuit B1 brings a control signal applied to a first input terminal of the logical adder B2 to a high level so as to turn on the transistor B3. Thus, the XRESET terminal goes to a low level (a reset state).

Besides, at the startup time of the semiconductor apparatus 10, after 50 [ms] (Typ.) is counted by a timer circuit (not shown) incorporated in the semiconductor apparatus 10 after startups of the analog power-supply voltage AVCC and the second output voltage VDCO2 are detected, the reset control circuit B1 turns off the transistor B3 to bring the XRESET terminal to a high level (a reset release).

Figure 7:
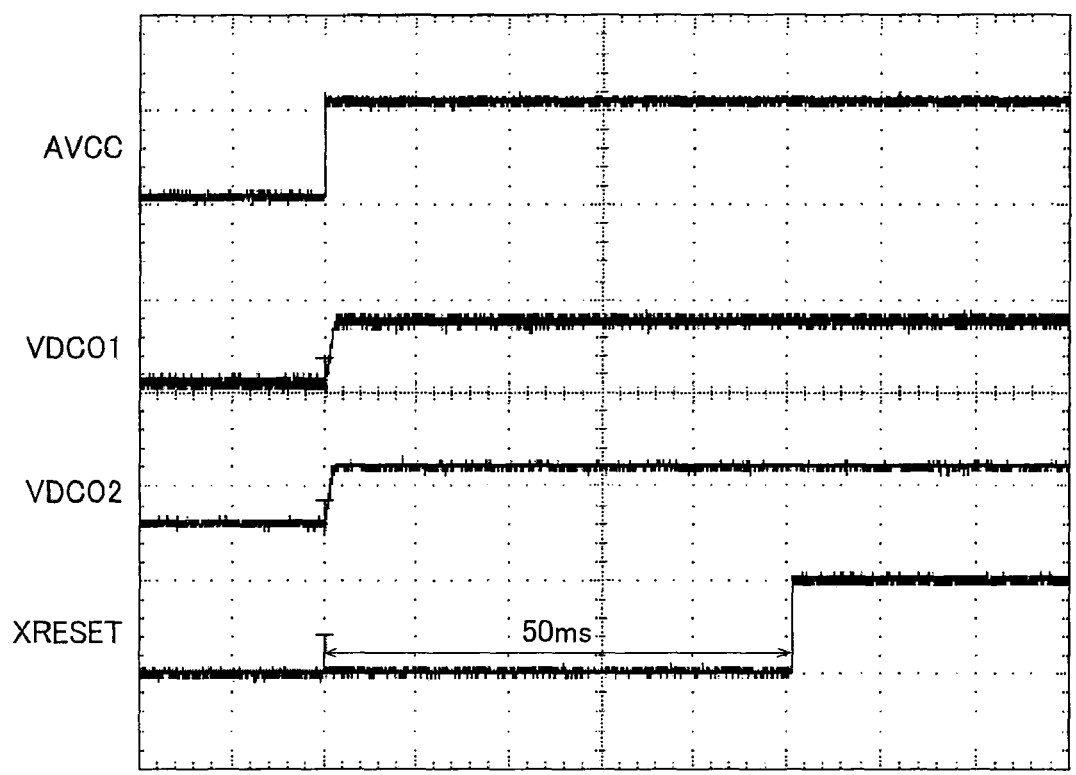
[FIG. 7] is a timing chart for describing start-up operation of a reset portion B.

FIG. 7 is a timing chart for describing the startup operation of the reset portion B, and the respective waveforms at the AVCC terminal, the VDCO1 terminal, the VDCO2 terminal and the XRESET terminal are shown subsequently from the top.

Besides, the XHRST terminal is connected to a second input terminal (an inverting input terminal) of the logical adder B2. Accordingly, by bringing the XHRST terminal to a low level, the transistor B3 is moved into an on state without depending on a control signal from the reset control circuit B1; and the XRESET terminal is brought to a low level (a reset state). Here, in a case of reset control using the XHRST terminal, the above timer circuit (50 [ms] (Typ.)) does not operate.

Next, a function of the LED driver portion C is described.

The LED driver portion C is a means that performs turning-on and -off control of an LED incorporated in the set; and goes into an on state when the XLEDON terminal is at a low level. On resistance of the transistor C2 incorporated in the LED driver portion C is up to 10 [Ω] and about 50 [mA] is assumed as the maximum output current.

Next, a function of the current switch portion D is described.

The current switch portion D is a means that performs on/off control of power supply to a pickup (especially a laser diode) incorporated in the set; and goes into an on state when the CSWON terminal is at a high level. The current switch portion D is used with the analog power-supply voltage AVCC and the like applied to the CSWI terminal side and with a load connected to the CSWO terminal side. Besides, on resistance of the transistor D2 incorporated in the current switch portion D is up to 1.0 [Ω] and about 100 [mA] is assumed as the maximum output current.

As described above, the semiconductor apparatus 10 in the present embodiment is so structured that besides the two-channel DC/DC converter portion A, the reset portion B, the LED driver portion C and the current switch portion D are incorporated. According to such structure, it becomes possible to form the circuit group on the periphery of the system power-supply IC onto one chip and easily compose the power-supply portions of a DVD and a CD.

Besides, according to the semiconductor apparatus 10 in the present embodiment, it becomes possible to achieve reduction in the set scale, improvement of the response speed and reduction in the consumed power compared with a structure in which the reset portion B, the LED driver portion C and the current switch portion D are each formed of separate ICs or formed of discrete parts.

Next, the startups of the output voltages VDCO1, VDCO2 are described.

Figure 8:
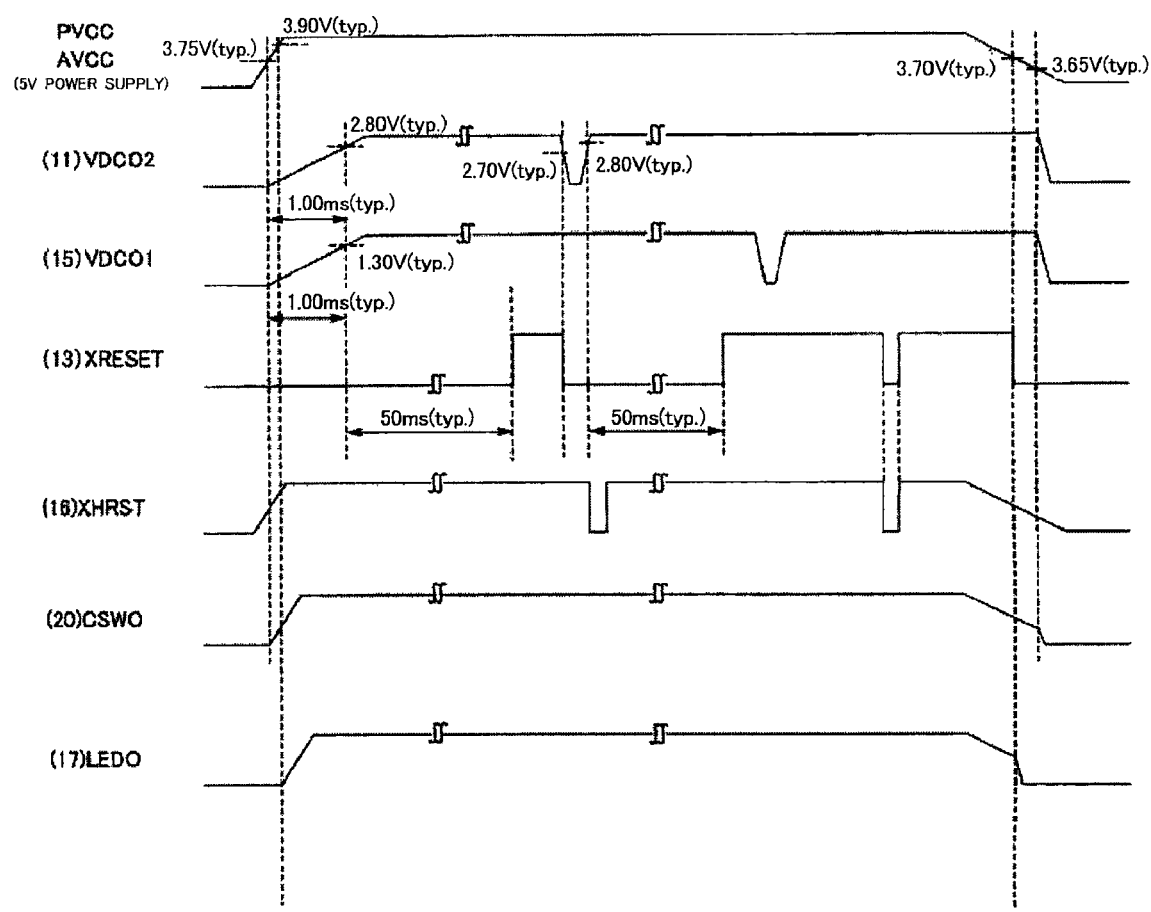
[FIG. 8] is a timing chart showing start-up waveforms of output voltages.

FIG. 8 is a timing chart showing startup waveforms of the output voltages, and subsequently from the top, shows the respective waveforms at the power-supply terminals (PVCC, AVCC), the VDCO2 terminal, the VDCO1 terminal, the XRESET terminal, the XHRSET terminal, the CSWO terminal and the LEDO terminal. FIG. 8 shows behaviors in a case where CS=5 [V], CSWON=5 [V], and XLEDON=0 [V].

When the voltage levels at the power-supply terminals (PVCC, AVCC) reach 3.75 [V], the UVLO is released and the DC/DC converter portion A starts operation. Here, the first DC/DC converter and the second DC/DC converter are started up at the same time. The soft-start period is set to 1 [ms]. Besides, in starting up the semiconductor apparatus 10, it is desirable to set each output of the DC/DC converter portion A to a light-load state.

The reset portion B monitors both analog power-supply voltage AVCC and second output voltage VDCO2; and brings the XRESET terminal to a high level (a reset release) after a predetermined time (50 [ms]) elapses after they reach 3.7 [V] and 2.7 [V], respectively (see FIG. 7).

After the reset state is released, for example, if the second output voltage VDCO2 becomes lower than 2.7 [V], the reset portion B brings the XRESET terminal to a low level (a reset state); thereafter, if the second output voltage VDCO2 exceeds 2.8 [V], after 50 [ms] elapses from the time point, the reset portion B brings the XRESET terminal to a high level (a reset release). On the other hand, because the first output voltage VDCO1 is not monitored, even if this drops, the XRESET terminal is not brought to a low level (a reset state).

Besides, with regard to a host reset by the XHRST terminal, during a time the XHRST terminal is kept at a low level, the reset portion B brings the XRESET terminal to a low level (a reset state); at a time point the XHRST terminal is brought back to the high level, the reset portion B immediately bring the XRESET terminal to a high level (a reset release). However, the host reset by the XHRST terminal is kept invalid in a period within 50 [ms] from the reset release by voltage monitoring.

Next, an overcurrent/short-circuit protection function is described.

As means for achieving an overcurrent/short-circuit protection function, the current limit circuits A41, A42, C3 and D3 are respectively connected to the control drivers A31, A32, the controller C1 and the controller D1 that control each output operation of the DC/DC converter portion A, the LED driver portion C and the current switch portion D. In other words, because the overcurrent/short-circuit protection function is incorporated in each output terminal other than the XRESET terminal, it becomes possible to protect the semiconductor apparatus 10 from breakage by a sudden GND short-circuit.

First, an overcurrent detection operation of the DC/DC converter portion A is described.

Figure 9:
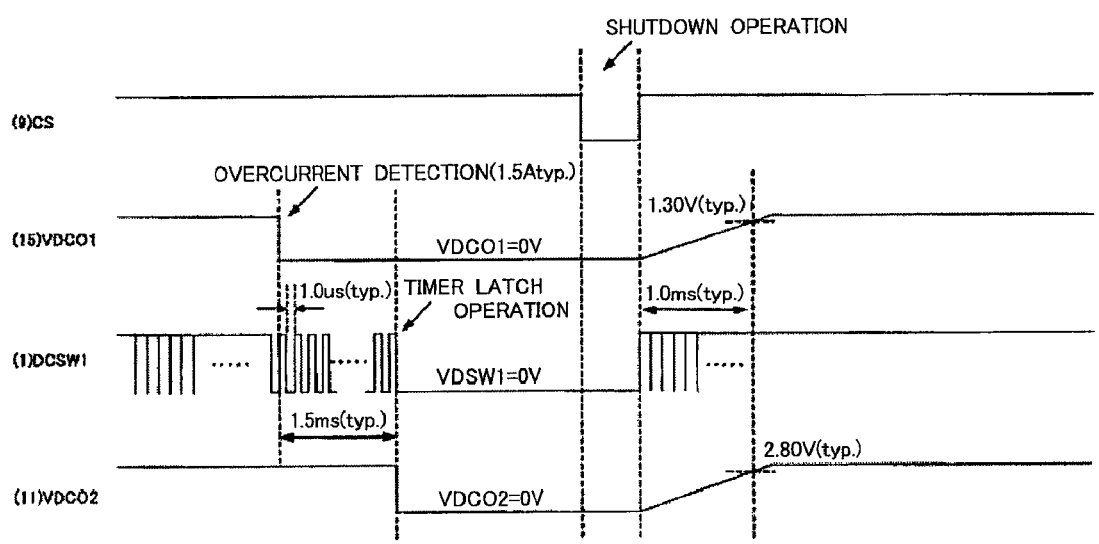
[FIG. 9] is a timing chart for describing overcurrent detection operation of a DC/DC converter portion A.

FIG. 9 is a timing chart for describing an overcurrent detection operation of the DC/DC converter portion A, and subsequently from the top, shows the respective waveforms at the CS terminal, the VDCO1 terminal, the DCSW1 terminal and the VDCO2 terminal. In FIG. 9, behaviors in a time an overcurrent appears in the first DC/DC converter that generates the first output voltage VDCO1 are shown as examples.

If an overcurrent (1.5 [A] (Typ.)) is detected by the current limit circuit A41, charging from the PVCC terminal into the output capacitor CO1 is inhibited for a predetermined period (1.0 [μs] (Typ.)) and the generation operation of the first output voltage VDCO1 is stopped. On the other hand, as long as an overcurrent is not detected by the current limit circuit A42, the generation operation of the second output voltage VDCO2 is continued. When the predetermined period elapses after the generation operation of the first output voltage VDCO1 is stopped, the generation operation of the first output voltage VDCO1 is resumed and an overcurrent determination is performed again by the current limit circuit A41. Here, if an overcurrent state is not resolved, as described above, the generation operation of the first output voltage VDCO1 is stopped for the predetermined period.

If such state continues for a predetermined period (1.5 [ms] (Typ.)), the short-circuit protection function (a timer off latch function) works, so that the generation operations of both first output voltage VDCO1 and second output voltage VDCO2 are stopped. To resume the output operation of the DC/DC converter portion A, the semiconductor apparatus 10 is turned on again, or a shutdown operation using the CS terminal is performed.

If an overcurrent appears in the second DC/DC converter that generates the second output voltage VDCO2, the generation operation of the second output voltage VDCO2 is intermittently stopped; then, finally, the generation operations of both first output voltage VDCO1 and second output voltage VDCO2 are stopped.

Next, an overcurrent detection operation of the LED driver portion C is described. Because the overcurrent detection operation of the current switch portion D is the same as that of the LED driver portion C, double description is skipped.

Figure 10:
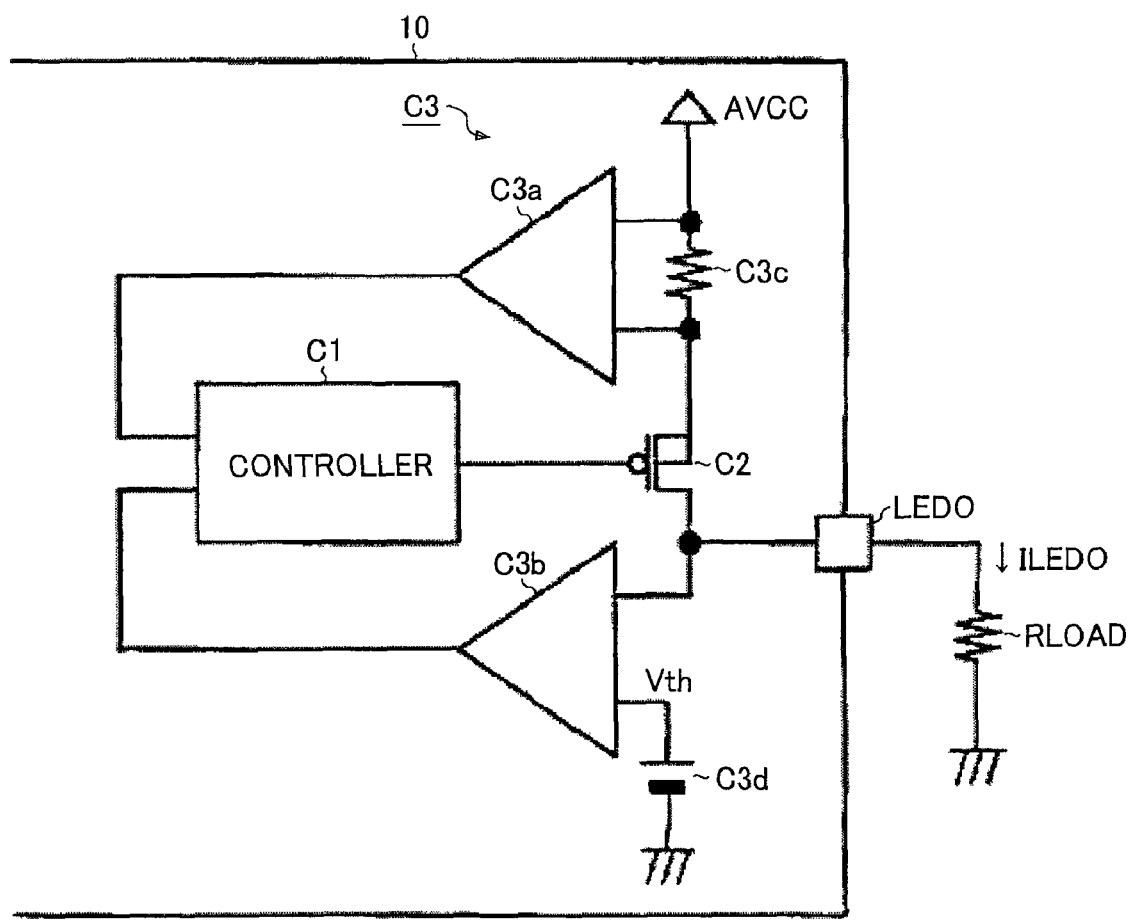
[FIG. 10] is a circuit diagram showing a structural example of a current limit circuit C3 incorporated in an LED driver portion C.

FIG. 10 is a circuit diagram showing a structural example of a current limit circuit C3 incorporated in the LED driver portion C. Besides, FIG. 11 is a correlative view showing a relationship between an output current ILEDO and an output voltage LEDO for an LED.

As shown in FIG. 10, the current limit circuit C3 includes: comparators C3a, C3b; a sense resistor C3c; and a DC voltage source C3d. The comparator C3a is a means that determines whether or not a voltage (a voltage signal that changes depending on the magnitude of the output current ILEDO) across both terminals of the sense resistor C3c reaches a predetermined value; the comparator C3b is a means that determines whether or not the output voltage LEDO reaches a predetermined value Vth.

Figure 11:
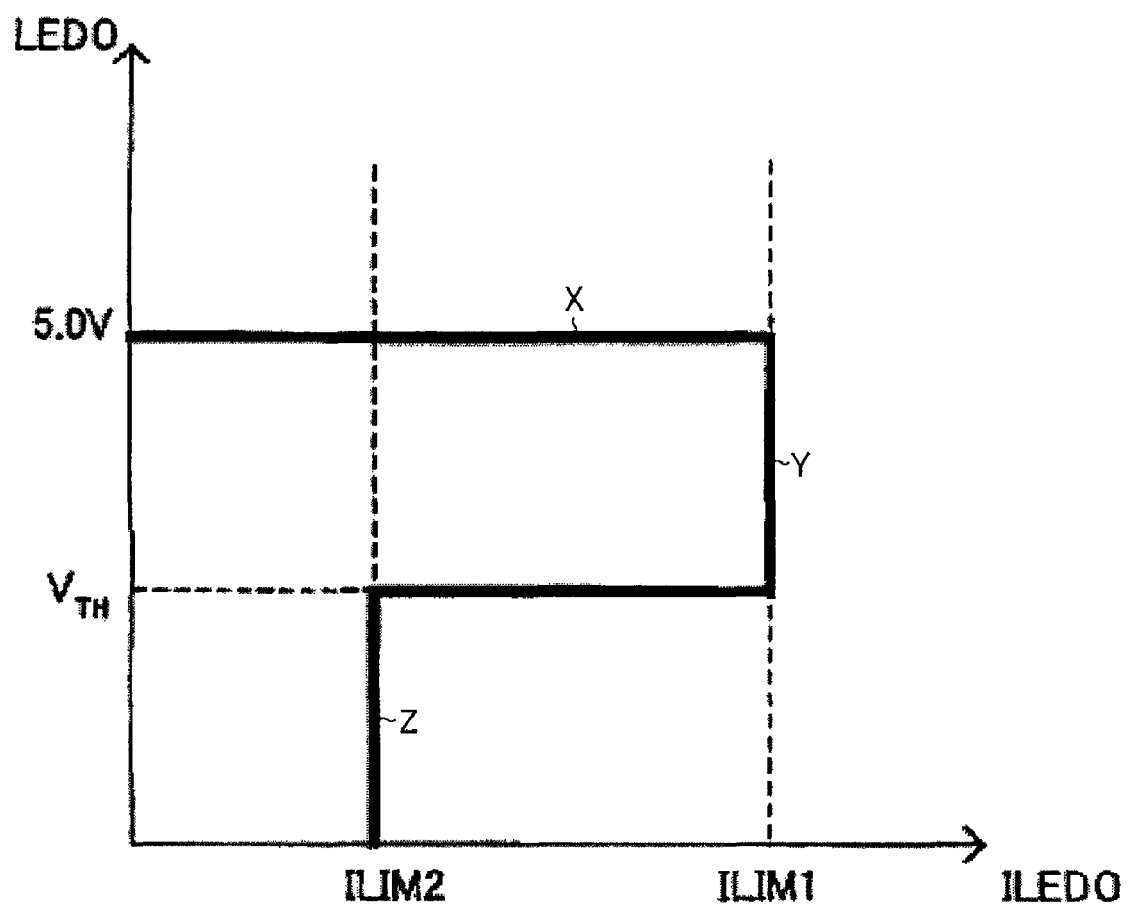
[FIG. 11] is a correlative view showing a relationship between an output current ILEDO and an output voltage LEDO.

Based on an output signal from the comparator C3a, the controller C1 determines whether or not the output current ILEDO reaches a first threshold value ILIM1; if the output current ILEDO dose not reach the first threshold value ILIM1, the controller C1 controls a conducting degree (on resistance) of the transistor C2 so as to keep the output voltage LEDO at a predetermined value (5.0 [V]) (see a constant voltage control period X in FIG. 11). On the other hand, if it is determined that the output current ILEDO reaches the first threshold value, to keep the output current ILEDO at the first threshold value ILIM1, the controller C1 controls the conducting degree (the on resistance) of the transistor C2 to drop the output voltage LEDO.

Here, based on an output signal from the comparator C3b, the controller C1 determines whether or not the output voltage LEDO is lower than the threshold value voltage Vth; if the output voltage LEDO is not lower than the threshold value voltage Vth, to continuously keep the output current ILEDO at the first threshold value ILIM1, the controller C1 controls the conducting degree (the on resistance) of the transistor C2 to drop the output voltage LEDO (see a first current limit period Y in FIG. 11). On the other hand, if it is determined that the output voltage LEDO is lower than the threshold value voltage Vth, to keep the output current ILEDO at a second threshold value ILIM2 lower than the first threshold value ILIM1, the controller C1 controls the conducting degree (the on resistance) of the transistor C2 to further drop the output voltage LEDO (see a second current limit period Z in FIG. 11).

As described above, by performing the two-step current limit operation, it becomes possible to raise safety of the semiconductor apparatus 10. Even in a case where an overcurrent is detected at the LEDO terminal, usual operations of the other output terminals (the VDCO1 terminal, the VDCO2 terminal and the CSWO terminal) are continued.

Next, an overvoltage mute function is described.

Figure 12:
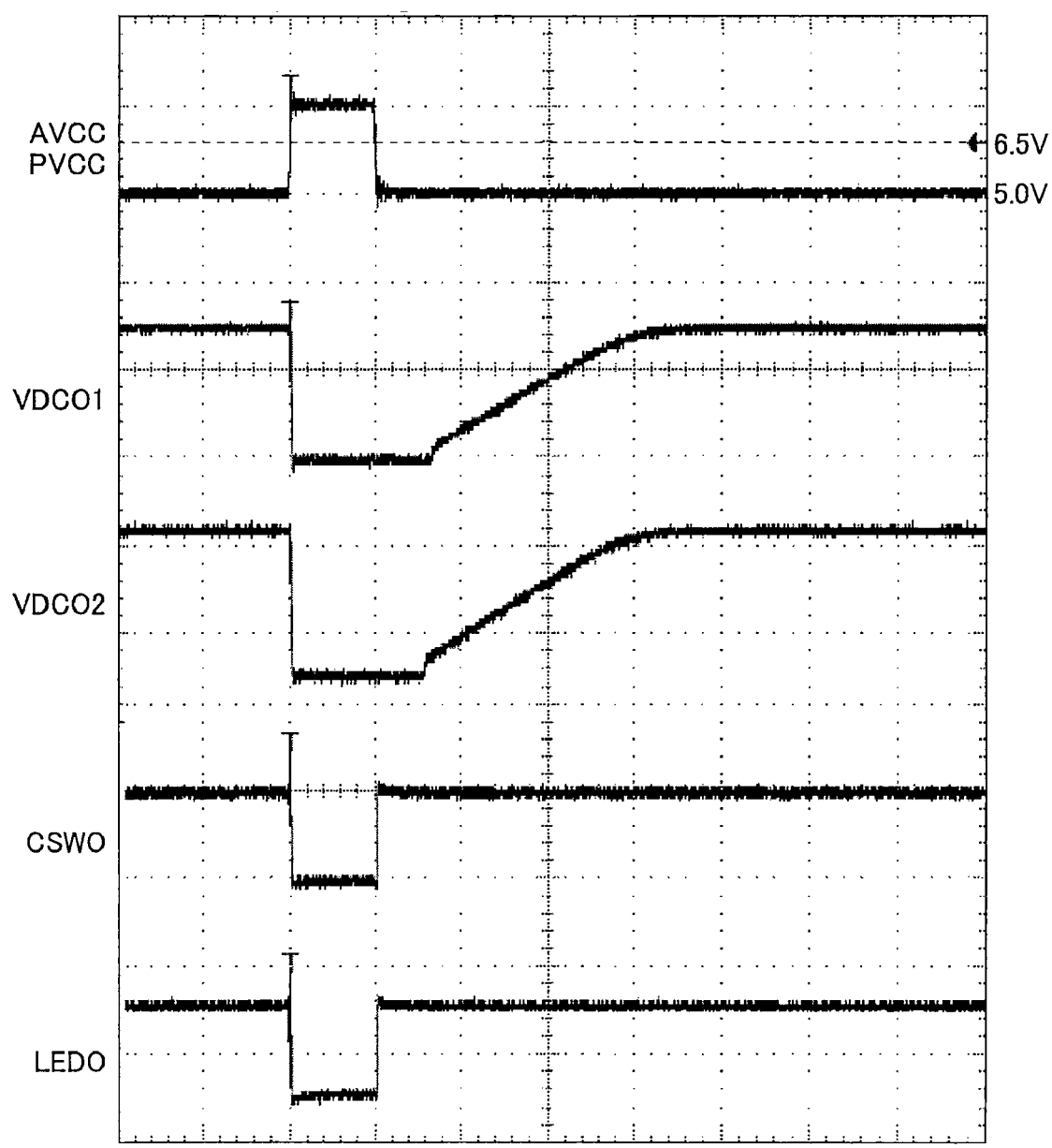
[FIG. 12] is a timing chart for describing an overvoltage mute function.

FIG. 12 is a timing chart for describing an overvoltage mute function, and subsequently from the top, the respective waveforms at the power-supply terminals (AVCC, PVCC), the VDCO1 terminal, the VDCO2 terminal, the CSWO terminal and the LEDO terminal are shown.

Although not shown in FIG. 1, in the semiconductor apparatus 10, an overvoltage mute circuit is incorporated as a means that prevents a malfunction of the semiconductor apparatus 10 due to an overvoltage. As shown in FIG. 12, if the power-supply voltages (AVCC, PVCC) becomes equal to or higher than 6.5 [V] (Typ.), the overvoltage mute function works, so that the DC/DC converter portion A stops switching. Thus, it becomes possible to prevent a malfunction of the semiconductor apparatus 10 due to an overvoltage.

Next, a UVLO function is described.

Figure 13:
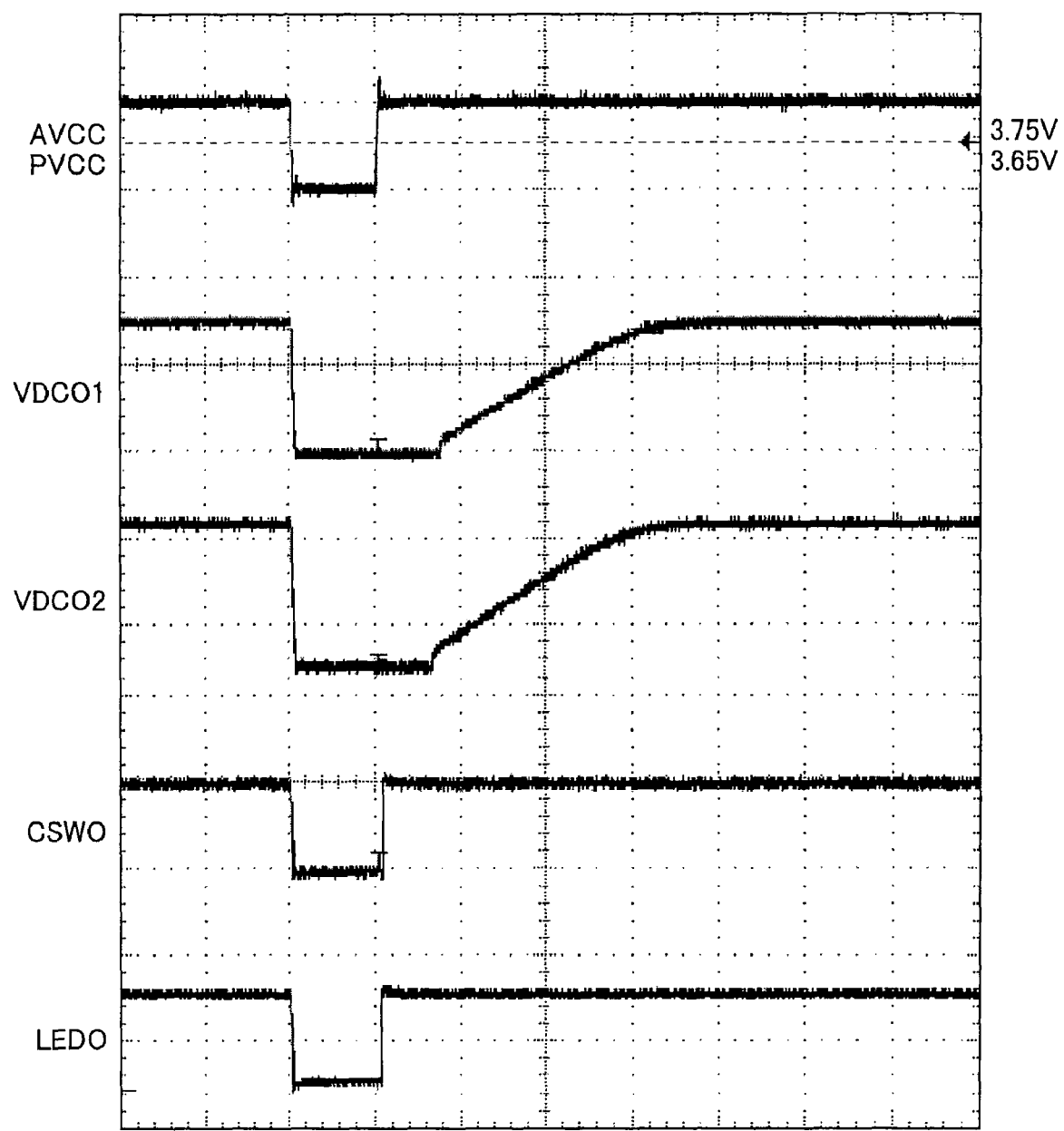
[FIG. 13] is a timing chart for describing a UVLO function.

FIG. 13 is a timing chart for describing a UVLO function, and subsequently from the top, the respective waveforms at the power-supply terminals (AVCC, PVCC), the VDCO1 terminal, the VDCO2 terminal, the CSWO terminal and the LEDO terminal are shown.

Although not shown in FIG. 1, in the semiconductor apparatus 10, a UVLO circuit is incorporated as a means that prevents a malfunction of the semiconductor apparatus 10 due to a decrease voltage. As shown in FIG. 13, if the power-supply voltages (AVCC, PVCC) becomes equal to or lower than 3.65 [V] (Typ.) (the LED driver portion C is equal to or lower than 3.7 [V] (Typ.)), the UVLO function works, so that the DC/DC converter portion A stops switching. Thus, it becomes possible to prevent a malfunction of the semiconductor apparatus 10 due to a decrease voltage. If the power-supply voltages (AVCC, PVCC) returns to 3.75 [V] or higher (the LED driver portion C is equal to or higher than 3.90 [V] (Typ.)), the shutdown is released and the generation operation of the output voltage is restarted.

Next, a shutdown function that uses the CS terminal is described.

Figure 14:
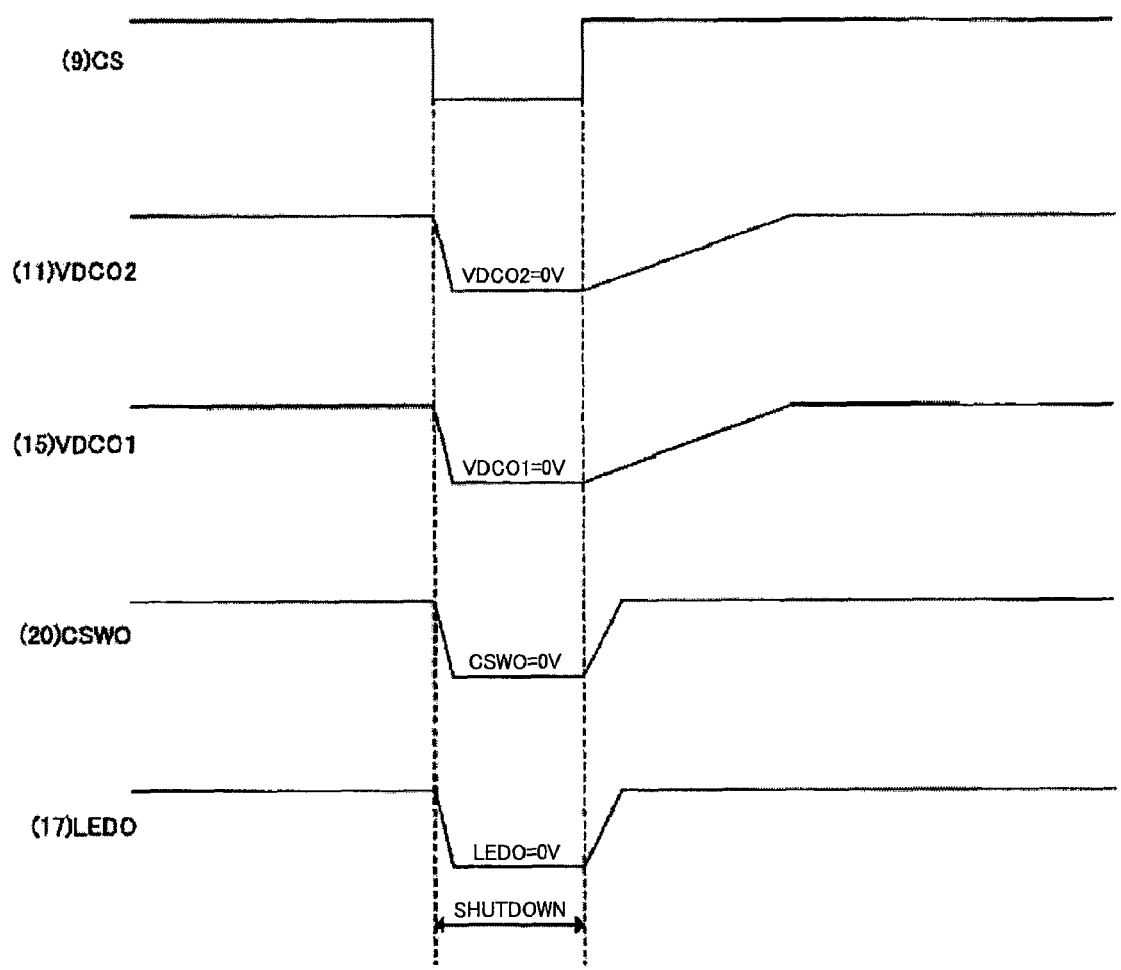
[FIG. 14] is a timing chart for describing a shutdown function that uses a CS terminal.

FIG. 14 is a timing chart for describing a shutdown function that uses the CS terminal, and subsequently from the top, the respective waveforms at the CS terminal, the VDCO2 terminal, the VDCO1 terminal, the CSWO terminal and the LEDO terminal are shown. FIG. 14 shows behaviors in a case where AVCC=PVCC=5[V], CSWON=5[V], and XLEDON=0[V].

As shown in FIG. 14, if the CS terminal is brought to a low level, like in the case where the above protection function (the UVLO function and the like) works, the DC/DC converter portion A stops switching. Besides, the outputs from the LED driver portion C and the current switch portion D become 0 [V]. Thereafter, if the CS terminal is brought to a high level, the shutdown is released and each output operation is resumed.

Here, in the above shutdown, the respective voltages at the VDCO1 terminal and the VDCO2 terminal are discharged via the on resistance of the low-side switches (transistors A61, A62) that form the output stage of the DC/DC converter portion A. Besides, the respective voltages at the CSWO terminal and the LEDO terminal are discharged via a resistor (not shown in FIG. 1) incorporated in the semiconductor apparatus 10.

Next, a thermal shutdown function is described.

Although not shown in FIG. 1, in the semiconductor apparatus 10, a thermal shutdown circuit is incorporated as a means that prevents thermal breakage of the semiconductor apparatus 10. If the chip temperature reaches Tjmax=175 [° C.] (Typ.), the thermal shutdown function works, so that the DC/DC converter portion A stops switching. According to such control, it becomes possible to protect the semiconductor apparatus 10 from a thermal runaway.

Figure 15:
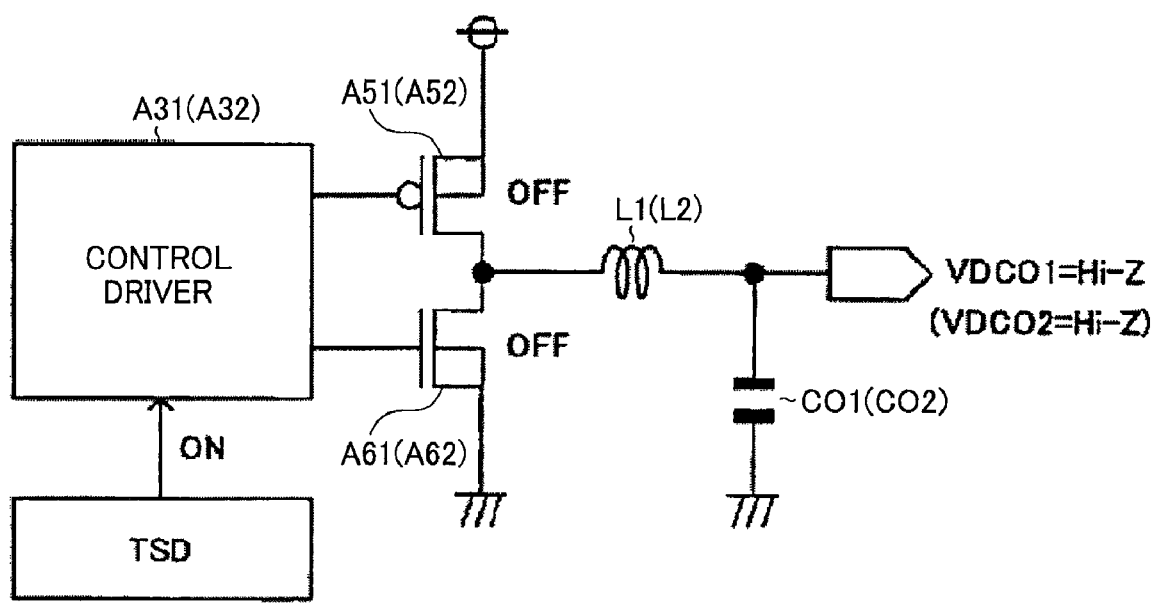
[FIG. 15] is a circuit diagram showing a switching state in a time of thermal shutdown.

Here, in a time of the above thermal shutdown, as shown in FIG. 15, all of the high-side transistors (A51, A52) and the low-side transistors (A61, A62) that form the output stage of the DC/DC converter portion A are turned off, so that both VDCO1 terminal and VDCO2 terminal are brought into a high-impedance state. In other words, unlike in the time of the shutdown that uses the above CS terminal, in the time of the thermal shutdown, the respective voltages at the VDCO1 terminal and the VDCO2 terminal are kept without being discharged. Accordingly, because a current does not flow in the low-side transistors (A61, A62) under unusually high temperature, it becomes possible to avoid breakage of the elements and further temperature increase. Here, the respective voltages at the LEDO terminal and the CSWO terminal are discharged via a resistor (not shown in FIG. 1) incorporated in the semiconductor apparatus 10 like in the time of the above shutdown that uses the CS terminal.

Next, phase compensation of the DC/DC converter portion A is described.

Figure 16:
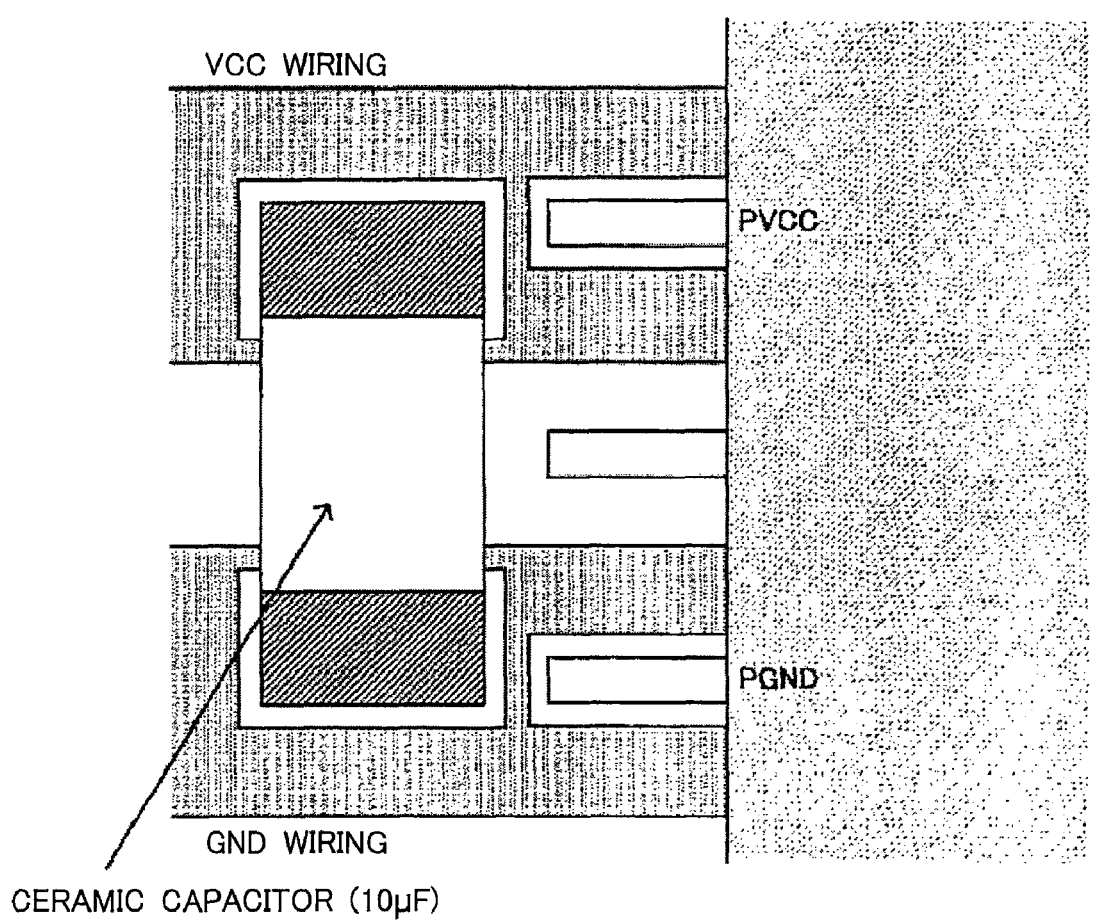
[FIG. 16] is a schematic view showing an arrangement example of bypass capacitors CB1, CB2.

The semiconductor apparatus 10 performs phase compensation of the error amplifiers A11, A12 in the apparatus; to perform a safe operation, it is desirable to use recommended values (1.5 [µH], 10 [µH]) or more) for the inductors L1, L2 and the output capacitors CO1, CO2. As an input capacitor, it is desirable to use a ceramic capacitor that is low in ESR and has 10 [µH] or more. Here, so that a safe operation is able to be performed even in a time of a heavy load, it is desirable to dispose the bypass capacitors CB1, CB2 between the PVCC terminal and the PGND terminal at the minimum distances from the semiconductor apparatus 10 as shown in FIG. 16. As the output capacitors CO1, CO2, it is possible to use ceramic capacitors; thus, it is possible to constitute a low-noise and low-ripple power supply. Besides, as shown in FIG. 5, it is desirable to pull out the outputs of the DC/DC converter portion A from both ends of the output capacitors CO1, CO2 as long as it is possible.

Next, phase compensation in the error amplifiers A11, A12 is described.

Figure 17:
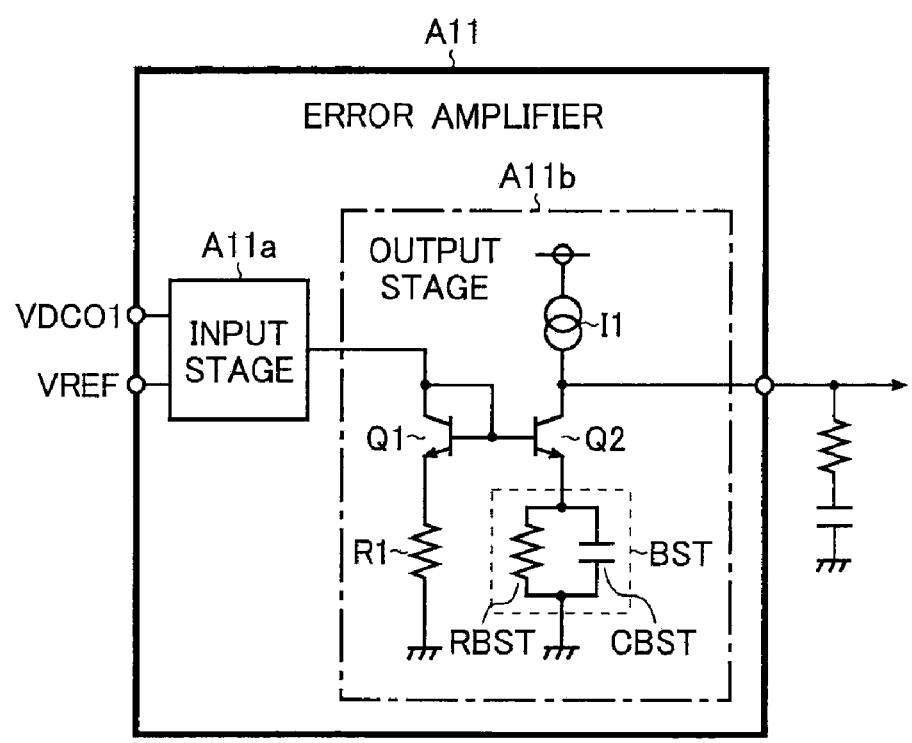
[FIG. 17] is a circuit diagram showing a structural example (especially the peripheral of an output stage) of an error amplifier.

FIG. 17 is a circuit diagram showing a structural example (especially the peripheral of an output stage) of the error amplifier A11. Because the error amplifier A12 has the same structure as that of the error amplifier A11, double description is skipped here.

The error amplifier A11 having the structural example is an output voltage feedback type current output amplifier, and includes: an input stage A11a into which a difference between the first output voltage VDCO1 and the reference voltage VREF is input; and an output stage A11b which transforms a voltage signal from the input stage A11a into an electric-current signal and outputs it.

The output stage A11b includes: an npn type bipolar transistor Q1 a collector of which is connected to an output terminal of the input stage A11a; an npn type bipolar transistor Q2 a base of which is connected to a base and a collector of the transistor Q1; a resistor R1 which is connected between an emitter of the transistor Q1 and a ground terminal; a constant-current source I1 which is connected between a collector of the transistor Q2 and a power-supply terminal; and a boost circuit BST which is connected between an emitter of the transistor Q2 and a ground terminal; and is so structured as to output an electric-current signal from the collector of the transistor Q2. The BST circuit includes a resistor RBST and a capacitor CBST that are connected in parallel with each other.

As described above, the output stage A11b of the error amplifier A11 is so structured as to output an electric-current signal by using a current mirror circuit that includes the pair of transistors Q1, Q2, and the boost circuit BST is inserted in this.

When the frequency of an electric-current signal is in a low-frequency range, the boost circuit BST functions as a resistor circuit that has a predetermined impedance; when the frequency of an electric-current signal is in a high-frequency range, the impedance drops and the boost circuit BST functions as a bypass circuit that shot-circuits the emitter of the transistor Q2 and the ground terminal in alternating-current fashion.

Accordingly, because the mirror ratio of the current mirror circuit that includes the transistors Q1, Q2 becomes large when the frequency of an electric-current signal is in a high-frequency range, it becomes possible to raise the gain of the error amplifier A11, and further becomes possible to keep a phase margin (a phase when the gain is 0 [db]).

Figure 18:
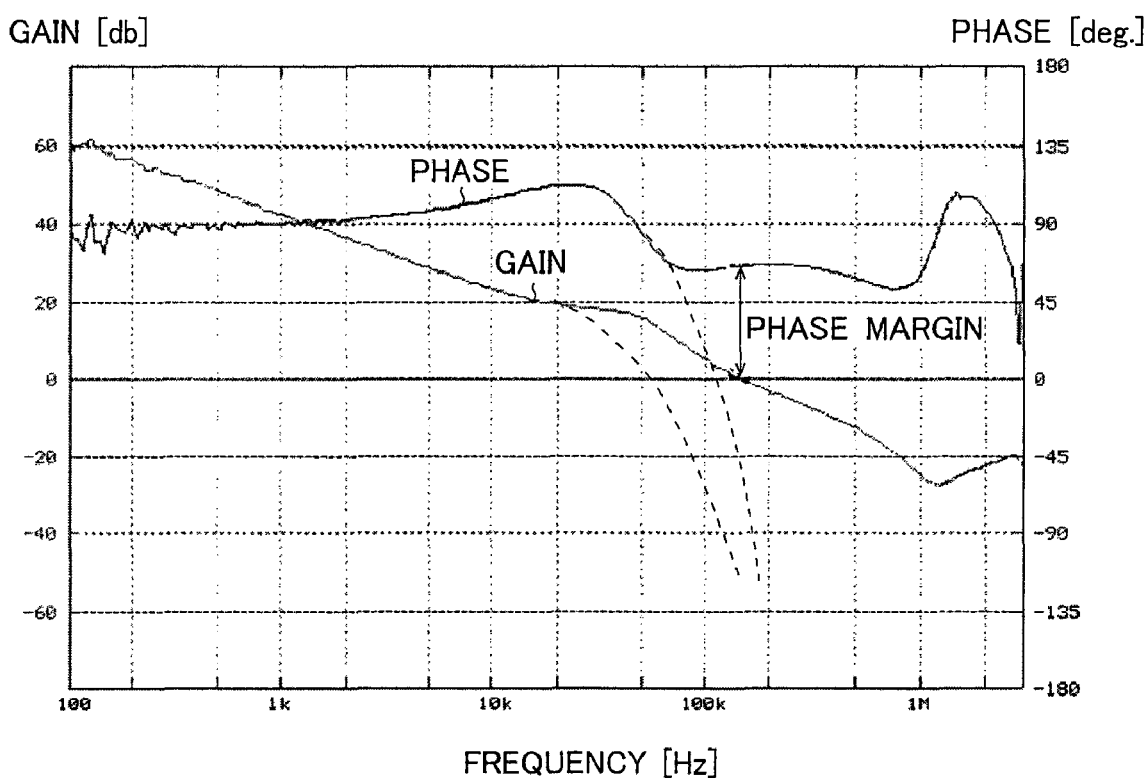
[FIG. 18] is a view showing a frequency characteristic of an error amplifier A11.

FIG. 18 is a view showing a frequency characteristic of the error amplifier A11, and the lateral axis indicates frequency and the vertical axis indicates phase and gain. In the view, a frequency characteristic in a case where the characteristic values of the inductor L1 and the output capacitor CO1 are set to 1.5 [µH] and 10 [µF], respectively. Besides, the solid lines in the view show behaviors of the present invention (with the boost circuit); the broken lines show behaviors of the conventional structure (with no boost circuits).

As shown in FIG. 18, according to the structure of the present invention, because it is possible to sufficiently keep the phase margin of the error amplifier A11 even in a case where elements whose characteristic values are small are used as the inductor L1 and the output capacitor CO1, it becomes possible to make the DC/DC converter operate stably even if the above characteristic values change more or less. Besides, because it is possible to drop the capacity value of a phase compensation capacitor connected to the output terminal of the error amplifier A11 down to a few picofarads [pF], it becomes possible to incorporate it into the semiconductor apparatus 10.

Next, a stabilization technology for an operating frequency is described.

Together with changes in the ambient temperature and the power-supply voltage, if the operating frequency of the DC/DC converter portion A dramatically changes from a desired set value (3 [MHz]), the above phase compensation is influenced and the output ripple increases. Accordingly, in the semiconductor apparatus 10, to flatten the temperature characteristic of a constant current Ic and the power-supply voltage characteristic that decide the oscillation frequency of an oscillator A8, a circuit structure of a constant-current source is devised.

Figure 19:
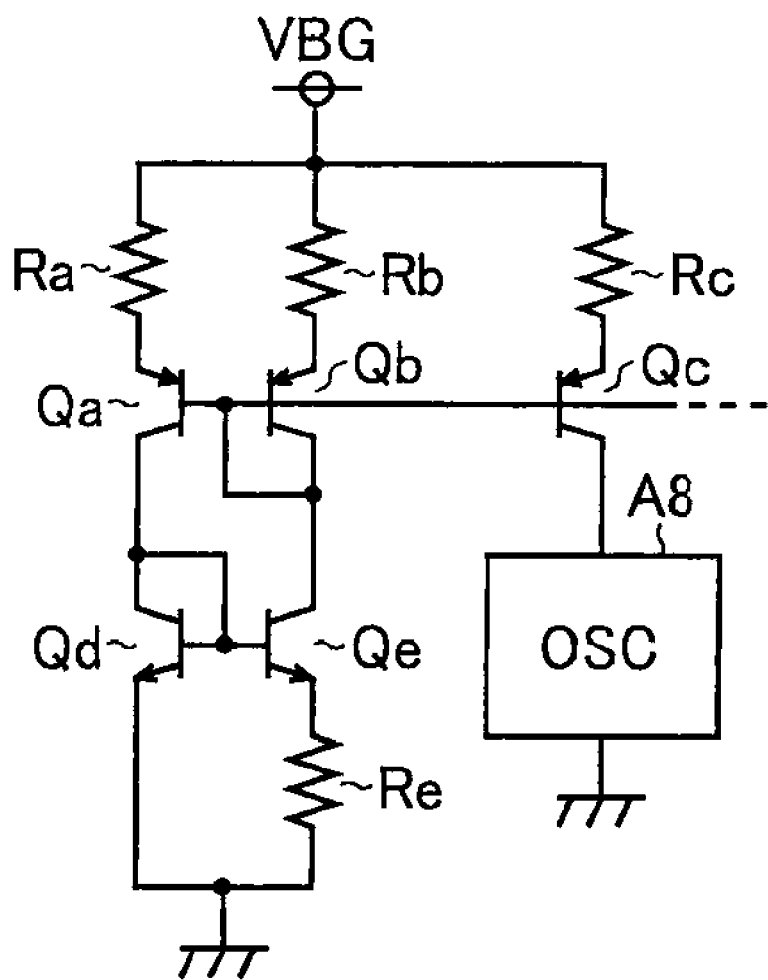
[FIG. 19] is a circuit diagram showing a structural example of a constant-current source.

FIG. 19 is a circuit diagram showing a structural example of a constant-current source.

As shown in this diagram, the constant-current source having the structural example includes pnp type bipolar transistors Qa, Qb, Qc, and npn type bipolar transistors Qd, Qe.

Emitters of the transistors Qa, Qb and Qc are connected to an application terminal of a band gap voltage VBG via resistors Ra, Rb, and Rc, respectively. All bases of the transistors Qa, Qb and Qc are connected to a collector of the transistor Qb. A collector of the transistor Qa is connected to a collector of the transistor Qd. The collector of the transistor Qb is connected to a collector of the transistor Qe. The collector of the transistor Qe is connected to a constant-current input terminal of the oscillator A8. Both bases of the transistors Qd and Qe are connected to the collector of the transistor Qd. An emitter of the transistor Qd is connected to a ground terminal. An emitter of the transistor Qe is connected to a ground terminal via the resistor Re.

As described above, to flatten the power-supply voltage characteristic of the constant current Ic, the constant-current source having the structural example uses the band gap voltage VBG generated by a band gap power-supply circuit as a drive voltage.

Besides, by making the temperature characteristic of a drop voltage Vf across the base and emitter of the transistor Qd and the temperature characteristic of the resistor Re cancel out each other, the constant-current source having the structural example flattens the temperature characteristic of the constant current Ic.

Figure 20:
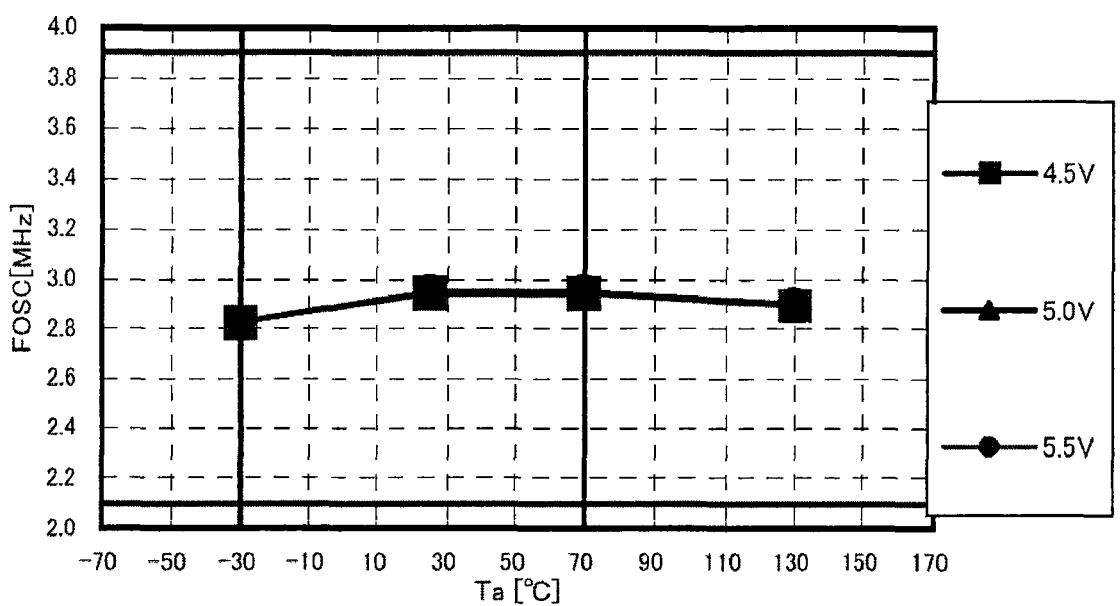
[FIG. 20] is a view showing a temperature characteristic of an operating frequency.

By using such constant-current source, as shown in FIG. 20, it becomes possible to keep the operating frequency of the DC/DC converter portion A at the desired set value (3 [MHz]).

Next, improvement of the characteristic of the DC/DC converter portion A is described.

Figure 21:
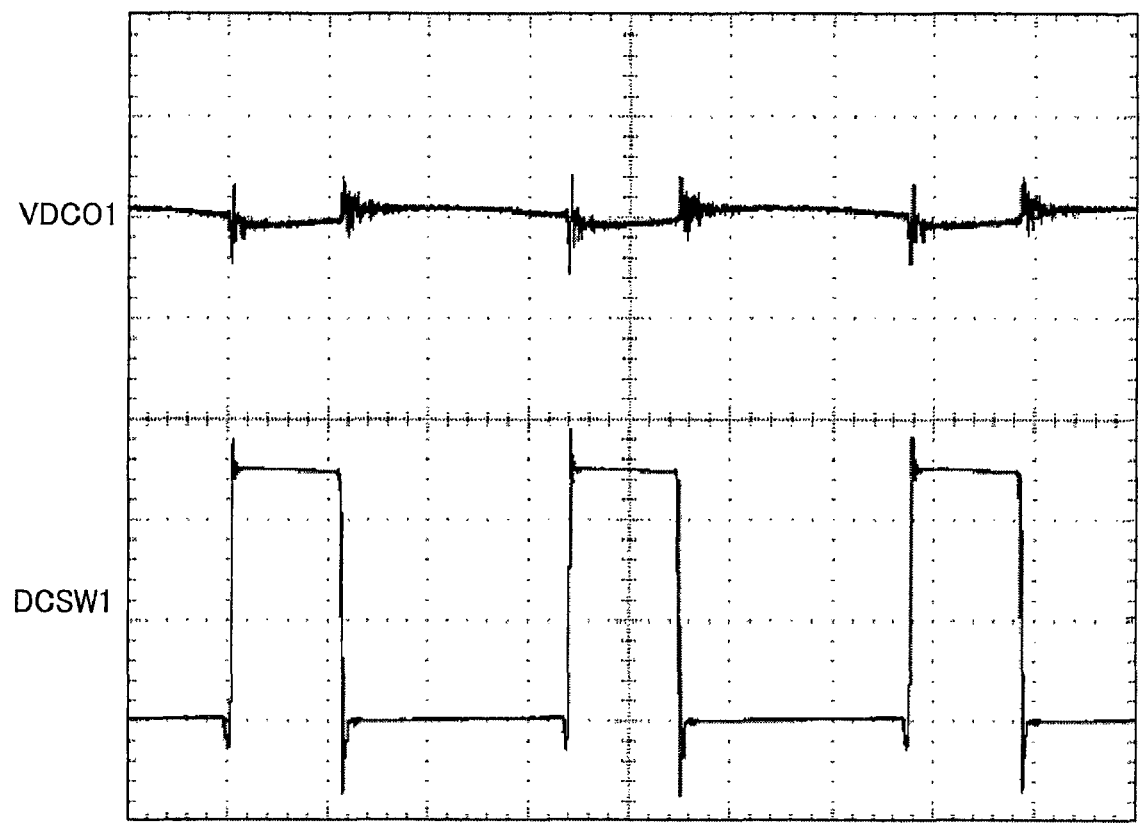
[FIG. 21] is a view showing output ripples from the DC/DC converter portion A.

The faster the speed of the operating frequency of the DC/DC converter portion A is, the smaller the output ripple can be curbed as shown in FIG. 21 even if the characteristic values of the inductors L1, L2 and the output capacitors CO1, CO2 that are connected to the output terminal are made small. On the other hand, if the speed of the operating frequency of the DC/DC converter portion A is made fast, the switching loss increases and the conversion efficiency drops.

Accordingly, in the DC/DC converter portion A, the operating frequency is raised from the conventional 1.5 (MHz) to 3 (MHz) and it is so devised that the conversion efficiency does not drop.

First, the period (the dead time) in which the transistors A51, A61 and the transistors A52, A62 are turned off at the same time is optimized, so that the switching loss is reduced.

If the operating frequency is set to 3 [MHz], the period of the PWM signal becomes 333.3 [ns] and the minimum pulse width of the PWM signal becomes about 60 [ns] (the minimum duty of 20%). Accordingly, an extremely short time of 5 to 10 [ns] must be accurately set as the dead time of the PWM signal.

Note that in the conventional structure, an RC time-constant circuit that includes a resistor and a capacitor is used to set the dead time; however, in such structure, because the influence of differences among elements is great, it is impossible to accurately set the dead time.

Accordingly, in the present invention, it is so structured that an element delay (a logical-inverse delay time of an inverter that includes a transistor) is used to set the dead time of the PWM signal. By employing such structure, because it is possible to accurately set the dead time of the PWM signal compared with the conventional structure that uses an RC time-constant circuit, it becomes possible to reduce the switching loss of the DC/DC converter portion A.

Figure 22:
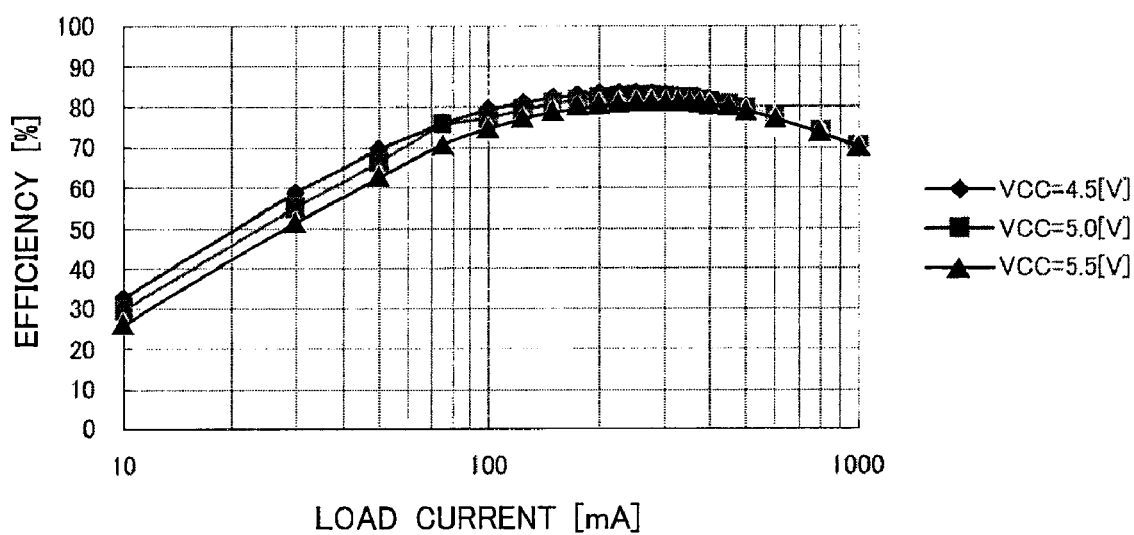
[FIG. 22] is a view showing a correlation between load current and conversion efficiency.

FIG. 22 is a view showing a correlation between load current and conversion efficiency. As shown in the view, according to the semiconductor apparatus 10, even if the operating frequency of the DC/DC converter portion A is set to 3 [MHz] and the characteristic values of the inductors L1, L2 and of the capacitors CO1, CO2 are set small, it becomes possible to obtain sufficiently high efficiency (especially, efficiency in a high-load range in which a current of hundreds of milliamperes [mA] is flowed as the load current).

Figure 23:
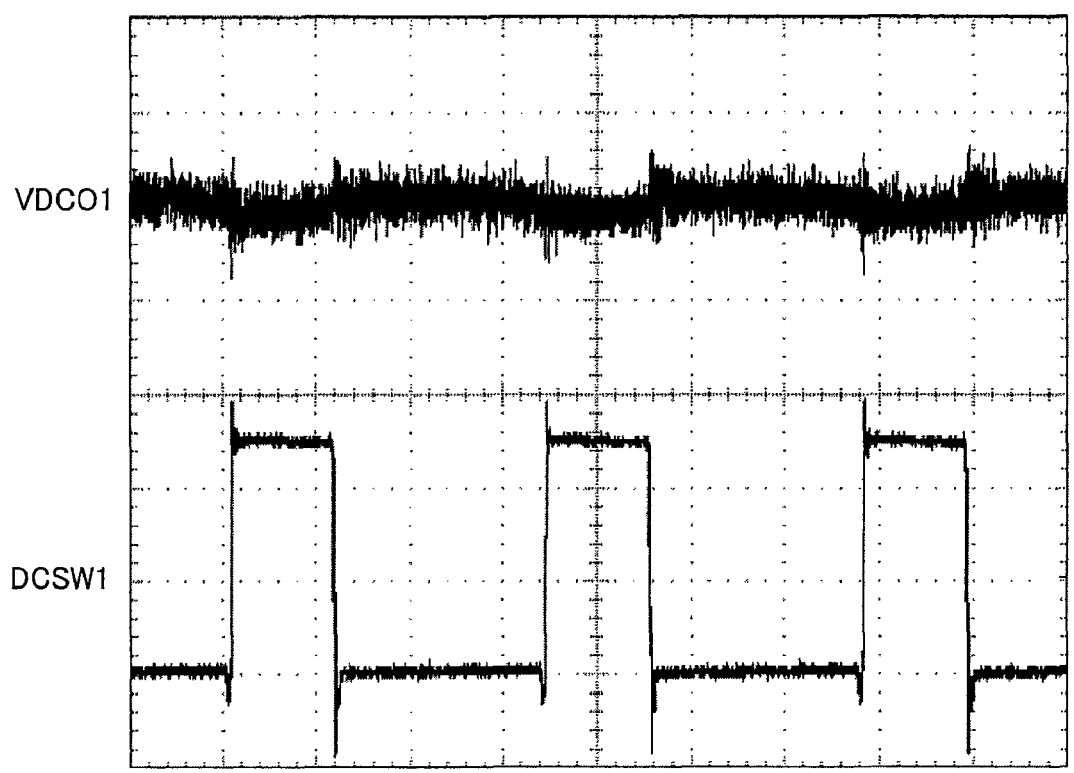
[FIG. 23] is a view showing output spike noise from the DC/DC converter portion A.
Figure 24:
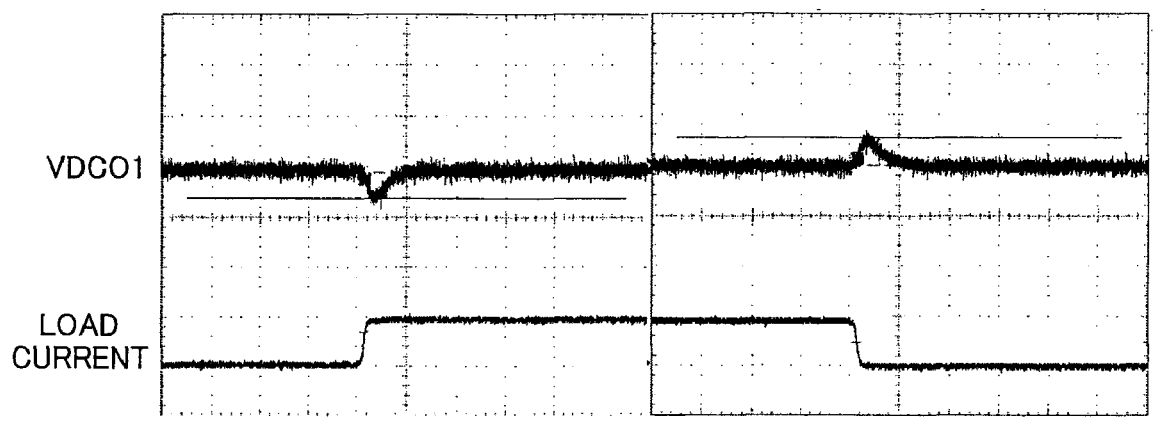
[FIG. 24] is a view showing an output load response of the DC/DC converter portion A.

Besides, in the process of optimizing the dead time of the PWM signal, because it is possible to estimate a capacity value of a parasitic capacitor that resides in the gates of the transistors A51, A61 and the transistors A52, A62, the electric-current capacity of the driver is adjusted and the slew rate is optimized according to this. By such adjustment, it becomes possible to achieve reduction in output spike noise (in an example in FIG. 23, reduction to a pp value=about 20 [mV] in the first output voltage VDCO1) and improvement of output load response (in an example in FIG. 24, an improvement of $\Delta V=25$ [mV] in the first output voltage VDCO1).

In the above embodiments, the structures according to the present invention are applied to a system power-supply LSI for optical disc drives such as a DVD drive, a CD drive and the like are described as examples. However, the application target of the present invention is not limited to these and wide applications to other power supply devices are possible.

In addition, besides the above embodiments, it is possible to add various modifications to the structures of the present invention without departing from the spirit of the present invention.

INDUSTRIAL APPLICABILITY

The present invention is a preferred technology for a system power-supply LSI that is used for optical disc drives such as a DVD drive, a CD drive and the like, for example.

The invention claimed is:

1. A power supply device comprising:
   an output transistor that, by being switching-controlled by a pulse-width modulation signal, outputs a rectangular-wave switch voltage based on an input signal;
   a reference voltage generation circuit that generates a predetermined reference voltage;
   an error amplifier into which a feedback voltage depending on the switching voltage and the reference voltage are input and which amplifies a difference between both to generate an error voltage and changes its gain based on an electric-current signal that is generated therein based on the feedback voltage and the reference voltage;
   an oscillator that generates an oscillation signal; and
   a comparator into which the oscillation signal and the error voltage are input and which compares them to output the pulse-width modulation signal.

2. The power supply device according to claim 1, wherein the error amplifier includes:
   an input stage into which the reference voltage and the feedback voltage are input and which outputs a voltage signal; and
   an output stage into which a voltage signal from the input stage is input and which converts the voltage signal into an electric-current signal;
   wherein a boost circuit whose impedance changes based on a frequency of the electric-current signal is inserted in the output stage.

3. The power supply device according to claim 2, wherein the output stage is so structured as to include a current mirror, wherein a voltage signal at the input stage is input into an input-side transistor of the current mirror; and the boost circuit is inserted between an output-side transistor of the current mirror and a ground terminal.

4. The power supply device according to claim 3, wherein the boost circuit is composed of a resistor and a capacitor that are connected in parallel with each other.

5. A power supply device comprising:
   an output transistor that outputs a rectangular-wave switch voltage based on an input signal by undergoing switching control by a pulse-width modulation signal;
   a first terminal that outputs the switch voltage;
   a reference voltage generation circuit that generates a predetermined reference voltage;
   a second terminal into which a feedback voltage that depends on the switch voltage is input;
   an error amplifier into which the feedback voltage input from the second terminal and the reference voltage are input and which amplifies a difference between both to generate an error voltage, and changes its gain according to an electric-current signal that is generated therein based on the feedback voltage and the reference voltage;
   an oscillator that generates an oscillation signal; and
   a comparator into which the oscillation signal and the error signal are input and which compares them to output the pulse-width modulation signal.

6. The power supply device according to claim 5, further comprising:
   an inductor whose one end is connected to the first terminal; and
   a capacitor that is connected to the other end of the inductor;
   wherein an output voltage is output from the other end of the inductor to a load.

7. The power supply device according to claim 6, wherein an inductance value of the inductor is 1.5 µH and a capacity value of the capacitor is 10 µF.

* * * * *